US009332199B2

(12) United States Patent
Furuta

(10) Patent No.: US 9,332,199 B2
(45) Date of Patent: May 3, 2016

(54) IMAGING DEVICE, IMAGE PROCESSING DEVICE, AND IMAGE PROCESSING METHOD

(71) Applicant: FUJIFILM Corporation, Tokyo (JP)

(72) Inventor: Yoshinori Furuta, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/552,671

(22) Filed: Nov. 25, 2014

(65) Prior Publication Data
US 2015/0077597 A1 Mar. 19, 2015

Related U.S. Application Data

(63) Continuation of application No. PCT/JP2013/061868, filed on Apr. 23, 2013.

(30) Foreign Application Priority Data

Jun. 7, 2012 (JP) .................................. 2012-129901

(51) Int. Cl.
H04N 5/359 (2011.01)
H04N 9/07 (2006.01)

(52) U.S. Cl.
CPC . *H04N 5/359* (2013.01); *H04N 9/07* (2013.01)

(58) Field of Classification Search
None
See application file for complete search history.

(56) References Cited

U.S. PATENT DOCUMENTS

| 5,889,554 A | 3/1999 | Mutze |
| 7,633,538 B2* | 12/2009 | Beck et al. ................... 348/272 |
| 8,174,599 B2* | 5/2012 | Kuroda et al. ................ 348/301 |
| 2009/0200451 A1 | 8/2009 | Conners |
| 2009/0219420 A1 | 9/2009 | Kuroda |
| 2010/0225795 A1 | 9/2010 | Suzuki et al. |
| 2013/0076939 A1 | 3/2013 | Kaizu et al. |

FOREIGN PATENT DOCUMENTS

| EP | 1 793 620 A1 | 6/2007 |
| JP | 2-210996 A | 8/1990 |

(Continued)

OTHER PUBLICATIONS

Extended European Search Report, issued Aug. 4, 2014, for European Application No. 11859479.5.
Extended European Search Report, issued Jan. 27, 2015, for European Application No. 12804973.1.
Extended European Search Report, issued Oct. 28, 2014, for European Application No. 11859950.5.

(Continued)

*Primary Examiner* — James Hannett
*Assistant Examiner* — Angel L Garces-Rivera
(74) *Attorney, Agent, or Firm* — Birch, Stewart, Kolasch & Birch, LLP

(57) ABSTRACT

An imaging device includes a photography optical system, and a single plate-type imaging element in which a plurality of pixels including two-dimensionally arranged photoelectric conversion elements and having a different underlayer layout are repeatedly arranged in a predetermined pattern, and color filters on the plurality of pixels, determination unit determines that a ghost is generated when an output level of one of the plurality of pixels and an output level of the same color pixel in the vicinity of the one pixel, which is the other pixel having a different underlayer layout from the one pixel, are different within a range in which the output levels do not exceed a predetermined threshold, and correction unit reducing a difference of the output level between the one pixel and the same color pixel in the vicinity when the determination unit determines that the ghost is generated.

26 Claims, 23 Drawing Sheets

(56) References Cited

FOREIGN PATENT DOCUMENTS

| JP | 2005-333251 A | 12/2005 |
| JP | 2009-206883 A | 9/2009 |
| JP | 2010-212769 A | 9/2010 |
| JP | 2010-268295 A | 11/2010 |
| JP | 2011-254321 A | 12/2011 |
| JP | 2012-9919 A | 1/2012 |

OTHER PUBLICATIONS

Hirakawa et al., "Spatio-Spectral Color Filter Array Design for Optimal Image Recovery," IEEE Transactions on Image Processing, vol. 17, No. 10, Oct. 2008, pp. 1876-1890.

International Search Report, issued in PCT/JP2013/061868, dated Jun. 18, 2013.

Written Opinion of the International Searching Authority, issued in PCT/JP2013/061868, dated Jun. 18, 2013.

* cited by examiner

|   | 1 | 2 | 3 | 4 | 5 | 6 |
|---|---|---|---|---|---|---|
| a | G | B | G | G | R | G |
| b | R | G | R | B | G | B |
| c | G | B | G | G | R | G |
| d | G | R | G | G | B | G |
| e | B | G | B | R | G | R |
| f | G | R | G | G | B | G |

FIG. 9B

|   | 1 | 2 | 3 | 4 | 5 | 6 |   |
|---|---|---|---|---|---|---|---|
| a | G | B | G | G | R | G | ← OUTPUT : HIGH |
| b | R | G | R | B | G | B |   |
| c | G | B | G | G | R | G | ← OUTPUT : HIGH |
| d | G | R | G | G | B | G |   |
| e | B | G | B | R | G | R | ← OUTPUT : HIGH |
| f | G | R | G | G | B | G |   |

| 5.5 | 5.5 | 5.5 | 5.5 | 5.5 | 5.5 | 5.5 | 5.5 |
|---|---|---|---|---|---|---|---|
| 5.5 | 5.0 | 5.0 | 5.0 | 5.0 | 5.0 | 5.0 | 5.5 |
| 5.5 | 5.0 | 4.5 | 4.5 | 4.5 | 4.5 | 5.0 | 5.5 |
| 5.5 | 5.0 | 4.5 | 4.0 | 4.0 | 4.5 | 5.0 | 5.5 |
| 5.5 | 5.0 | 4.5 | 4.0 | 4.0 | 4.5 | 5.0 | 5.5 |
| 5.5 | 5.0 | 4.5 | 4.5 | 4.5 | 4.5 | 5.0 | 5.5 |
| 5.5 | 5.0 | 5.0 | 5.0 | 5.0 | 5.0 | 5.0 | 5.5 |
| 5.5 | 5.5 | 5.5 | 5.5 | 5.5 | 5.5 | 5.5 | 5.5 |

FIG. 20

|  | COLUMN 0 | COLUMN 1 | COLUMN 2 | COLUMN 3 | COLUMN 4 | COLUMN 5 |
|---|---|---|---|---|---|---|
| ROW 0 | G00 | B | G20 | B30 | R | G50 |
| ROW 1 | R | G11 | R | B | G41 | B |
| ROW 2 | G02 | B | G22 | G32 | R | G52 |
| ROW 3 | G03 | R | G23 | G33 | B | G53 |
| ROW 4 | B | G14 | B | R | G44 | R |
| ROW 5 | G05 | R | G25 | G35 | B | G55 |

FIG. 25

| R00 | G10 | G20 | B30 | G40 | G50 | R60 |
|-----|-----|-----|-----|-----|-----|-----|
| G01 | B11 | R21 | G31 | R41 | B51 | G61 |
| G02 | R12 | B22 | G32 | B42 | R52 | G62 |
| B03 | G13 | G23 | R33 | G43 | G53 | B63 |
| G04 | R14 | B24 | G34 | B44 | R54 | G64 |
| G05 | B15 | R25 | G35 | R45 | B55 | G65 |
| R06 | G16 | G26 | B36 | G46 | G56 | R66 |

FIG. 26

| R00 | G10 | G20 | B30 | G40 | G50 | R60 |
|-----|-----|-----|-----|-----|-----|-----|
| G01 | B11 | R21 | G31 | R41 | B51 | G61 |
| G02 | R12 | B22 | G32 | B42 | R52 | G62 |
| B03 | G13 | G23 | R33 | G43 | G53 | B63 |
| G04 | R14 | B24 | G34 | B44 | R54 | G64 |
| G05 | B15 | R25 | G35 | R45 | B55 | G65 |
| R06 | G16 | G26 | B36 | G46 | G56 | R66 |

IMAGING DEVICE, IMAGE PROCESSING DEVICE, AND IMAGE PROCESSING METHOD

CROSS REFERENCE TO RELATED APPLICATIONS

This application is a Continuation of PCT International Application No. PCT/JP2013/061868 filed on Apr. 23, 2013, which claims priority under 35 U.S.C §119(a) to Patent Application No. 2012-129901 filed in Japan on Jun. 7, 2012, all of which are hereby expressly incorporated by reference into the present application.

BACKGROUND OF THE INVENTION

1. Field of the Invention

The present invention relates to an imaging device, an image processing device, and an image processing method and, more particularly, to an imaging device, an image processing device, and an image processing method in which detection and correction of change in output of an imaging element due to ghost light is performed.

2. Description of the Related Art

In the field of an imaging device, an image processing device, or an image processing method, a technology for performing detection and correction of a ghost is known. For example, setting processing conditions for reducing degradation of image quality when it is determined that image quality of a captured image is degraded based on a position of a high-luminance portion detected in the captured image or setting processing conditions for preventing a ghost generated due to the high-luminance portion from outstanding is described in JP2010-268295A. Further, comparing reference data with each pixel data of a captured image, detecting the presence or absence of an output level difference of the same color pixel between adjacent lines of an imaging element, and correcting a luminance level value of the pixel data when the output level difference is detected are described in JP2005-333251A.

SUMMARY OF THE INVENTION

However, in such related art, an output level difference of the imaging element due to a ghost cannot be appropriately detected and corrected. For example, in JP2010-268295A described above, even when a high luminance portion is out of an angle of view of a captured image, the ghost is determined to be generated. Further, in JP2005-333251A described above, when the output level difference is detected, a luminance level value of corresponding pixel data is corrected uniformly. Accordingly, an output level difference that should not be originally corrected may be corrected, and the related art is applicable to only a case in which a color filter array is a Bayer array in the case of ghost light by a red component. The present invention has been made in view of such circumstances, and an object of the present invention is to provide an imaging device, an image processing device, and an image processing method capable of appropriately performing ghost detection and correction.

According to a first aspect of the present invention, an imaging device includes a photography optical system; a single plate-type imaging element in which a plurality of pixels including two-dimensionally arranged photoelectric conversion elements and having a different underlayer layout are repeatedly arranged in a predetermined pattern, and color filters in a predetermined color filter array are arranged on the plurality of pixels; a determination unit configured to determine that a ghost is generated when an output level of one of the plurality of pixels and an output level of the same color pixel in the vicinity of the one pixel, which is the other pixel having a different underlayer layout from the one pixel, are different within a range in which the output levels do not exceed a previously set threshold; and a correction unit configured to perform correction to reduce a difference between the output level of the one pixel and the output level of the same color pixel in the vicinity when the determination unit determines that the ghost is generated.

If respective pixels of the imaging element has a different underlayer layout, there are pixels in which incident ghost light is directly incident on a light receiving element such as a photodiode. However, there is a case in which ghost light is blocked by the underlayer and not incident on the light receiving element in some pixels. As a result, a difference is generated in an output level between the pixels having a different underlayer layout, and a pattern according to the underlayer layout is generated in a captured image.

Such a difference in the output level may be generated even when normal light, not the ghost light, is incident, but is at a level that is not problematic due to a small output difference because light from various angles is generally incident when light passing through a lens is incident on a light receiving element. However, in the case of the ghost light, the light from a specific angle may be strongly incident due to, for example, reflection within the lens, and the output level difference increases when such incident light at the specific incidence angle is incident at an angle causing an output level difference (step) of the imaging element. Therefore, in the case of the ghost light, the output level difference increases and a pattern according to the underlayer layout is generated. Therefore, in the imaging device according to the first aspect of the present invention, a determination is made as to whether a ghost is generated based on the difference in the output level of the same color pixels having a different underlayer layout.

In the first aspect, the "underlayer layout" refers to elements not directly contributing to light reception, such as a circuit element or wiring for charge transfer arranged on or near a light receiving unit of the imaging element. Since the difference in the output level is generated due to ghost light in the pixels having a different underlayer, a determination as to the ghost generation can be made based on this output level difference (output level difference between the same color pixels having a different underlayer layout).

When the determination is performed only with the output level difference in the determination of the ghost generation described above, and there is a light and shade pattern in a subject, the output level difference due to the light and shade pattern may be erroneously determined to be the output level difference due to the ghost light and unnecessary correction may be performed. However, an incidence angle of the ghost light or the output level difference caused by the ghost light can be a predicted based on a configuration of the imaging element or characteristics of the lens. Therefore, in the image processing device according to the first aspect, the ghost is determined to be generated when the output levels differ within a range in which the output level difference does not exceed the previously set threshold. Accordingly, it is possible to prevent the output level difference due to the pattern of the subject from being erroneously determined to be the output level difference due to the ghost and to appropriately perform the detection and the correction of the ghost. Here, the above threshold may be the maximum of the output level difference that may be generated due to the ghost light. If the output level difference exceeds the threshold, the step is recognized to be due to a pattern and/or a shape of the subject, and the correction is not performed. If the output level difference is equal to or less than the threshold, the step is recognized to be due to the ghost, and the correction is performed to reduce a difference between the output level of one color pixel and the output level of the same color pixel in the vicinity so that the ghost does not stand out.

Further, in the first aspect, "vicinity" includes pixels adjacent in vertical, horizontal and diagonal directions, but is not limited thereto. This is because there may be no same color pixels on adjacent lines in some color filter arrays. Further, pixels corresponding to "vicinity" may be determined according to a range in which a difference (step) in the output level is expected to be generated due to characteristics of the imaging element or a ghost.

Further, the "photography optical system" in the first aspect refers to an entire optical system that is arranged from an imaging element to a near side (a side near a subject) when viewed in an incident direction of light, and includes an interchangeable lens including, for example, a lens group such as a photography lens (imaging lens), a zoom lens and a focus lens, a diaphragm, and a lens barrel that holds them, a sealing glass of a package of an image sensor (imaging element), and an infrared ray (IR) cutting filter arranged thereon. When light incident on the photography optical system is reflected by the above member and light from a specific angle is strongly incident on the imaging element, the influence thereof appears as the output level difference described above.

A second aspect of the present invention provides the imaging device according to the first aspect in which the imaging element has a different underlayer layout between adjacent lines in the two-dimensional array, and the determination unit determines that the ghost is generated when the output levels of the same color pixels present on the adjacent lines are different within a range in which the output levels do not exceed the threshold. The second aspect shows one aspect of the underlayer layout and the ghost determination according to this. If the underlayer layout differs between adjacent lines, the step is generated in the output level between the adjacent lines due to the ghost light and the ghost is generated in a stripe shape in a captured image. However, according to the second aspect, it is possible to appropriately detect and correct the ghost.

A third aspect of the present invention provides the imaging device according to the first or second aspect in which the determination unit determines that the ghost is generated when the difference between the output level of the one pixel and the output level of the other pixel is repeatedly generated according to a repetition period of the underlayer layout. It is possible to appropriately perform the detection and the correction of the ghost in consideration of a circumstance in which the step of the output level due to the ghost is generated to spread on the pixel of the imaging element.

A fourth aspect of the present invention provides the imaging device according to any one of the first to third aspects in which the determination unit performs the determination on the pixels corresponding to all filter colors of the color filters, and the correction unit performs the correction on pixels corresponding to a color in which the ghost is determined to be generated. In the imaging element including the color filters, a level of the output and a level of the output step may differ according to the respective colors of the color filters, but it is possible to reduce false detection and improper correction by performing the detection and the correction on the pixels corresponding to all the colors, as in the fourth aspect.

A fifth aspect of the present invention provides the imaging device according to any one of the first to fourth aspects in which the determination unit performs a determination as to whether a ghost is generated with respect to a pixel corresponding to one of the filter colors of the color filters, and when the determination unit determines that the ghost is generated with respect to the one color, the correction unit performs the correction on pixels corresponding to all filter colors of the color filters including the one color. In the fifth aspect, the color filter can select a pixel appropriate for the determination of the ghost generation in consideration of the fact that the number and the arrangement of pixels may differ according to the colors. For example, in the case of a color filter including a number of green (G) pixels, a ghost generation determination is performed on the G pixels. When the ghost is determined to be generated, the ghost is determined to be generated with respect to the other colors (for example, red (R) and blue (B)) as well as G, and the correction is performed.

A sixth aspect of the present invention provides the imaging device according to any one of the first to fifth aspects in which the threshold used by the determination unit is set according to a pixel position of a captured image. An incidence angle of normal light other than the ghost differs in a peripheral portion of a screen in comparison with a central portion, and the normal light is generally incident in an oblique direction in the peripheral portion. Therefore, a step having a certain size is generated due to the normal light in the peripheral portion. Thus, setting a higher threshold in the peripheral portion of the screen than in the central portion is considered as an example of threshold setting according to the pixel position of the captured image, and a probability of improper correction can be reduced by such a threshold setting.

A seventh aspect of the present invention provides the imaging device according to any one of the first to sixth aspects in which the determination unit performs the determination based on a threshold set according to each component of the imaging element. In the imaging element, the level of the output step may differ due to variations in production. Therefore, it is possible to reduce false detection and improper correction by setting a high threshold for an element in which the step due to the ghost easily increases and a low threshold for an element in which the step decreases.

An eighth aspect of the present invention provides the imaging device according to any one of the first to seventh aspects in which an imaging surface of the imaging element is divided into a plurality of areas, and the determination unit performs the determination based on an integration value of output levels of the same color pixels within at least one of the plurality of areas. It is possible to detect the generation of the ghost with higher precision by performing the determination based on the integration value of the output levels (for example, comparing the average integration value obtained by averaging integration values with the threshold) as in the eighth aspect.

A ninth aspect of the present invention provides the imaging device according to any one of the first to eighth aspects in which the correction unit reduces the generated output level difference by decreasing a higher output level among an output level of the one pixel and an output level of the other pixel to a lower output level. In the eighth aspect, one aspect of correction for causing the generated ghost not to stand out is defined.

A tenth aspect of the present invention provides the imaging device according to any one of the first to ninth aspects in which the determination unit and the correction unit perform the determination and the correction after scratch correction and color mixture correction of a signal output from the imaging element is performed and before noise removal correction of the signal is performed. The step is corrected through the correction of the step of the output level due to the ghost, but it is preferable to perform the ghost correction after the step due to normal color mixture is performed through color mixture correction since there is a possibility of increase in step when the color mixture correction is performed after the step correction. Further, since a step is reduced in noise correction, the ghost step is also reduced and the determination of the ghost becomes less accurate. Therefore, it is preferable to perform the ghost step correction before the noise correction. Further, it is preferable to perform the determination at such a correction timing.

It is possible to appropriately perform the detection and correction of the ghost by performing the determination and correction at the timing defined in the tenth aspect.

An eleventh aspect of the present invention provides the imaging device according to any one of the first to tenth aspects in which a function of an optical low pass filter is not mounted in the photography optical system, that is, the function of an optical low pass filter is not included.

When a photography optical system does not have an optical low pass filter (LPF), since a high-frequency component of a subject image incident on the imaging element is not cut, light having a light and shade pattern of the same level as a pixel size is incident on the imaging surface of the imaging element. Therefore, when the photography optical system does not have an optical low pass filter, the determination as to "whether the output level difference between adjacent pixels is due to a high frequency pattern of an original subject or ghost light incidence" is important in comparison with a case in which the photography optical system has the optical low pass filter, and thus, each aspect of the present invention capable of accurately performing the determination of the ghost generation is particularly effective.

A twelfth aspect of the present invention provides the imaging device according to any one of the first to eleventh aspects in which the color filter array includes a predetermined basic array pattern in which first filters corresponding to a first color contributing most to obtaining a luminance signal and second filters corresponding to two or more second colors other than the first color are arranged, the basic array pattern is repeatedly arranged in horizontal and vertical directions, and at least one filter with the same color among the first filter and the second filter is continuously arranged over two or more pixels in the horizontal and vertical directions in the basic array pattern.

In the imaging device according to the twelfth aspect, one aspect of the color filter array of the imaging element is defined. However, in such a color filter array, since the same color pixels (pixels corresponding to the first filter or the second filter) are adjacent in the horizontal and vertical directions (in a general Bayer array, the respective color filters are adjacent in the diagonal direction, but an arrangement in which color filters are most adjacent in horizontal and vertical directions is not included), the underlayer layout may differ between the same color pixels that are adjacent. In this case, when the ghost light is incident on the imaging element, the output level difference between the same color pixels that are adjacent remarkably appears, and thus, the ghost detection and correction of the present invention described above are particularly effective.

A thirteenth aspect of the present invention provides the imaging device according to the twelfth aspect in which one or more first filters and one or more second filters are arranged within each of the lines in the horizontal and vertical directions of the color filter array within the basic array pattern, and the first filters are arranged so that a portion in which two or more of the first filters are adjacent in each of the horizontal, vertical, upper right diagonal and upper left diagonal directions is included within the basic array pattern.

A fourteenth aspect of the present invention provides the imaging device according to the twelfth or thirteenth aspect in which, in the color filter array, two or more first filters are continuously arranged in the vertical and horizontal directions with any one color filter of the second filters interposed between the first filters.

A fifteenth aspect of the present invention provides the imaging device according to any one of the twelfth to fourteenth aspects in which the first filters in the color filter array are arranged up, down, right, and left in a 3×3 pixel group with a filter at a center interposed between the first filters, and the 3×3 pixel group is repeatedly arranged in the horizontal and vertical directions.

A sixteenth aspect of the present invention provides the imaging device according to any one of the twelfth to fifteenth aspects in which the first color is green (G), the second colors are red (R) and blue (B), the color filters include an R filter, a G filter and a B filter corresponding to the red (R), the green (G), and the blue (B), and the color filter array includes a first array corresponding to 3×3 pixels, in which an R filter is arranged at a center, a B filter is arranged at four corners, and a G filter is arranged up, down, right and left with the R filter at the center interposed between the G filters, and a second array corresponding to 3×3 pixels, in which a B filter is arranged at a center, an R filter is arranged at four corners, and a G filter is arranged up, down, right and left with the B filter at the center interposed between the G filters, the first array and the second array being alternately arranged in the horizontal and vertical directions.

In the imaging device according to the thirteenth to sixteenth aspects, other aspects of the color filter array of the imaging element are defined. However, in such a color filter array, since the output level difference due to ghost light remarkably appears as in the color filter array in the twelfth aspect, the ghost detection and correction of the present invention described above are particularly effective.

A seventeenth aspect of the present invention provides the imaging device according to any one of the first to eleventh aspects in which the color filter array includes a predetermined basic array pattern in which a first filter corresponding to a first color contributing most to obtaining a luminance signal among colors of the filters of the color filters, and second filters corresponding to two or more second colors other than the first color are arranged, the basic array pattern being repeatedly arranged in the horizontal and vertical directions, and one or more first filters are arranged in each of the lines in the horizontal, vertical, upper right diagonal, and upper left diagonal directions of the color filter array, and one or more second filters are arranged in each of lines in the horizontal and vertical directions of the color filter array within the basic array pattern. In the seventeenth aspect, another aspect of the color filter array is defined.

An eighteenth aspect of the present invention provides the imaging device according to the seventeenth aspect in which the color filter array includes a portion in which two or more first filters are continuous in each of the lines in the vertical, horizontal, upper right diagonal, and upper left diagonal directions.

A nineteenth aspect of the present invention provides the imaging device according to the seventeenth or eighteenth aspect in which the color filter array includes a square array corresponding to 2×2 pixels including the first filters.

A twentieth aspect of the present invention provides the imaging device according to any one of the seventeenth to nineteenth aspects in which, in the color filter array, the first filter is arranged at the center and four corners in a 3×3 pixel group, and the 3×3 pixel group is repeatedly arranged in the horizontal and vertical directions.

A twenty-first aspect of the present invention provides the imaging device according to any one of the seventeenth to twentieth aspects in which the first color is green (G), the second colors are red (R) and blue (B), the predetermined basic array pattern is a square array pattern corresponding to 6×6 pixels, and the color filter array includes a first array corresponding to 3×3 pixels, in which the G filter is arranged at the center and four corners, the B filter is arranged up and down with the G filter at the center interposed between the B filters, and the R filter is arranged right and left with the G filter at the center interposed between the R filters, and a second array corresponding to 3×3 pixels, in which the G filter is arranged at the center and four corners, the R filter is arranged up and down with the G filter at the center interposed between the R filters, and the B filter is arranged right and left with the G filter at the center interposed between the B filters, the first array and the second array being alternately arranged in the horizontal and vertical directions.

In the imaging device according to the seventeenth to twenty-first aspects, one aspect of the color filter array of the imaging element is defined. However, in such a color filter array, since an output level difference due to the ghost light remarkably appears as in the color filter array in the twelfth to sixteenth aspects, the ghost detection and correction of the present invention described above are particularly effective.

In order to achieve the above object, an image processing device according to a twenty-second aspect of the present invention includes a single plate-type imaging element in which a plurality of pixels including two-dimensionally arranged photoelectric conversion elements and having a different underlayer layout are repeatedly arranged in a predetermined pattern, and color filters in a predetermined color filter array are arranged on the plurality of pixels; a determination unit configured to determine that a ghost is generated when an output level of one of the plurality of pixels and an output level of the same color pixel in the vicinity of the one pixel, which is the other pixel having a different underlayer layout from the one pixel, are different within a range in which the output levels do not exceed a previously set threshold; and a correction unit configured to perform correction to reduce a difference between the output level of the one pixel and the output level of the same color pixel in the vicinity when the determination unit determines that the ghost is generated.

A configuration, operation and effects of the image processing device according to the twenty-second aspect are the same as those of the imaging device according to the first aspect, but the image processing device according to the twenty-second aspect differs from that according to the first aspect in that the detection and the correction of the ghost caused by, for example, the lens device mounted on the image processing device are performed.

In order to achieve the above object, an imaging device according to a twenty-third aspect of the present invention includes the image processing device according to the twenty-second aspect; a lens device mounted on the image processing device; a storage unit configured to store lens information of the lens device and the threshold in association with each other; and a lens information acquisition unit configured to acquire lens information of a lens mounted on the image processing device, in which the determination unit acquires the threshold corresponding to the acquired lens information by referring to the storage unit, and performs the determination based on the acquired threshold. The step of the output level due to the ghost light differs according to the lens information that depends on characteristics such as the type of lens or a component difference, or usage conditions. Accordingly, in the imaging device according to the twenty-third aspect, the ghost generation determination and correction are performed using the threshold according to the lens information of the lens mounted on the image processing device, and hence it is possible to appropriately perform the detection and correction of the ghost. Such a configuration is particularly effective in a lens-interchangeable imaging device.

A twenty-fourth aspect of the present invention provides the imaging device according to the twenty-third aspect in which the lens information includes at least one of an aperture value, a zoom position, and a focus position of the mounted lens. Therefore, the ghost generation determination and correction are performed using the threshold according to such information. In the twenty-fourth aspect, the "lens information" in the twenty-third aspect is specifically defined.

A twenty-fifth aspect of the present invention provides the imaging device according to the twenty-third to twenty-fourth aspects in which a function of an optical low pass filter is not included. As described above in connection with the eleventh aspect, when the function of an optical low pass filter is not included as in the twenty-fifth aspect, each aspect of the present invention capable of accurately performing the determination of the ghost generation is particularly effective.

In order to achieve the above object, an image processing method according to a twenty-sixth aspect of the present invention is an image processing method in an imaging device including a photography optical system, and a single plate-type imaging element in which a plurality of pixels including two-dimensionally arranged photoelectric conversion elements and having a different underlayer layout are repeatedly arranged in a predetermined pattern, and color filters in a predetermined color filter array are arranged on the plurality of pixels, the method including: a determination step of determining that a ghost is generated when an output level of one of the plurality of pixels and an output level of the same color pixel in the vicinity of the one pixel, which is the other pixel having a different underlayer layout from the one pixel, are different within a range in which the output levels do not exceed a previously set threshold; and a correction step of performing correction to reduce a difference between the output level of the one pixel and the output level of the same color pixel in the vicinity when it is determined in the determination step that the ghost is generated. In the image processing method according to the twenty-sixth aspect, it is possible to appropriately perform the detection and correction of the ghost, as in the imaging device according to the first aspect.

In order to achieve the above object, an image processing method according to a twenty-seventh aspect of the present invention is an image processing method in an image processing device including a single plate-type imaging element in which a plurality of pixels including two-dimensionally arranged photoelectric conversion elements and having a different underlayer layout are repeatedly arranged in a predetermined pattern, and color filters in a predetermined color filter array are arranged on the plurality of pixels, the method comprising: a determination step of determining that a ghost is generated when an output level of one of the plurality of pixels and an output level of the same color pixel in the vicinity of the one pixel, which is the other pixel having a different underlayer layout from the one pixel, are different within a range in which the output levels do not exceed a previously set threshold; and a correction step of performing correction to reduce a difference between the output level of the one pixel and the output level of the same color pixel in the vicinity when it is determined in the determination step that the ghost is generated. In the image processing method according to the twenty-seventh aspect, it is possible to appropriately perform the detection and correction of the ghost, as in the image processing device according to the twenty-second aspect.

In order to achieve the above object, an image processing program according to a twenty-eighth aspect of the present invention causes the image processing device to execute the image processing method according to the twenty-sixth or twenty-seventh aspect. Further, a computer-readable code of the image processing program according to the twenty-eighth aspect is recorded in a recording medium according to a twenty-ninth aspect of the present invention. Such a recording medium may be any magnetic memory, a magneto-optical recording device, or the like.

As described above, according to the imaging device, the image processing device, and the image processing method according to the present invention, it is possible to appropriately perform the detection and correction of the ghost.

BRIEF DESCRIPTION OF THE DRAWINGS

FIG. 8 is a diagram used to illustrate a concept of the basic array pattern included in the color filter array of the imaging element.

FIG. 9A is a diagram illustrating a state of a filter array of color filters CF, and FIG. 9B is a diagram illustrating a state in which an output level difference is generated between adjacent lines due to a ghost.

FIG. 20 is a diagram illustrating a state of detection and correction of an output level difference in an area of 6 pixels×6 pixels.

FIG. 25 is a diagram used to illustrate a pixel interpolation method in a synchronization process when it is determined that a correlation direction is in a vertical direction.

FIG. 26 is a diagram used to illustrate a pixel interpolation method in a synchronization process when it is determined that a correlation direction is in an upper left diagonal direction.

DESCRIPTION OF THE PREFERRED EMBODIMENTS

A form for carrying out an imaging device, an image processing device, and an image processing method according to the present invention will be described in detail with reference to the accompanying drawings.

<First Embodiment>
<Configuration of Imaging Device>

Figure 1:
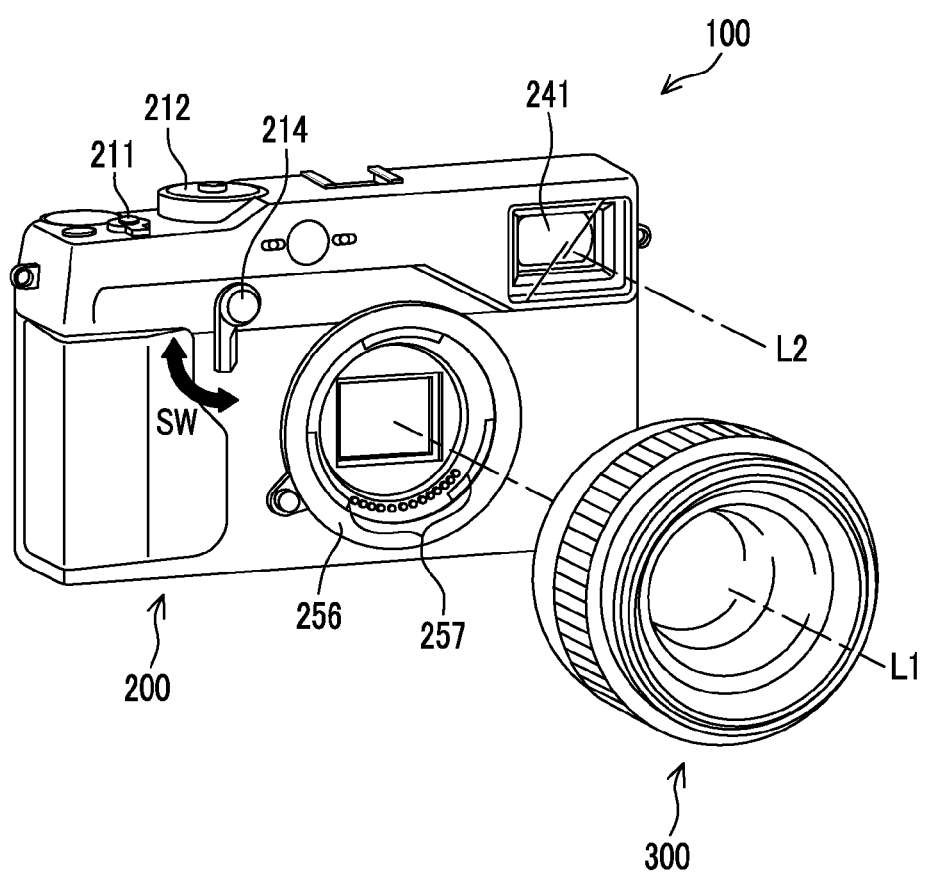
FIG. 1 is an appearance perspective view of an imaging device 100.
Figure 2:
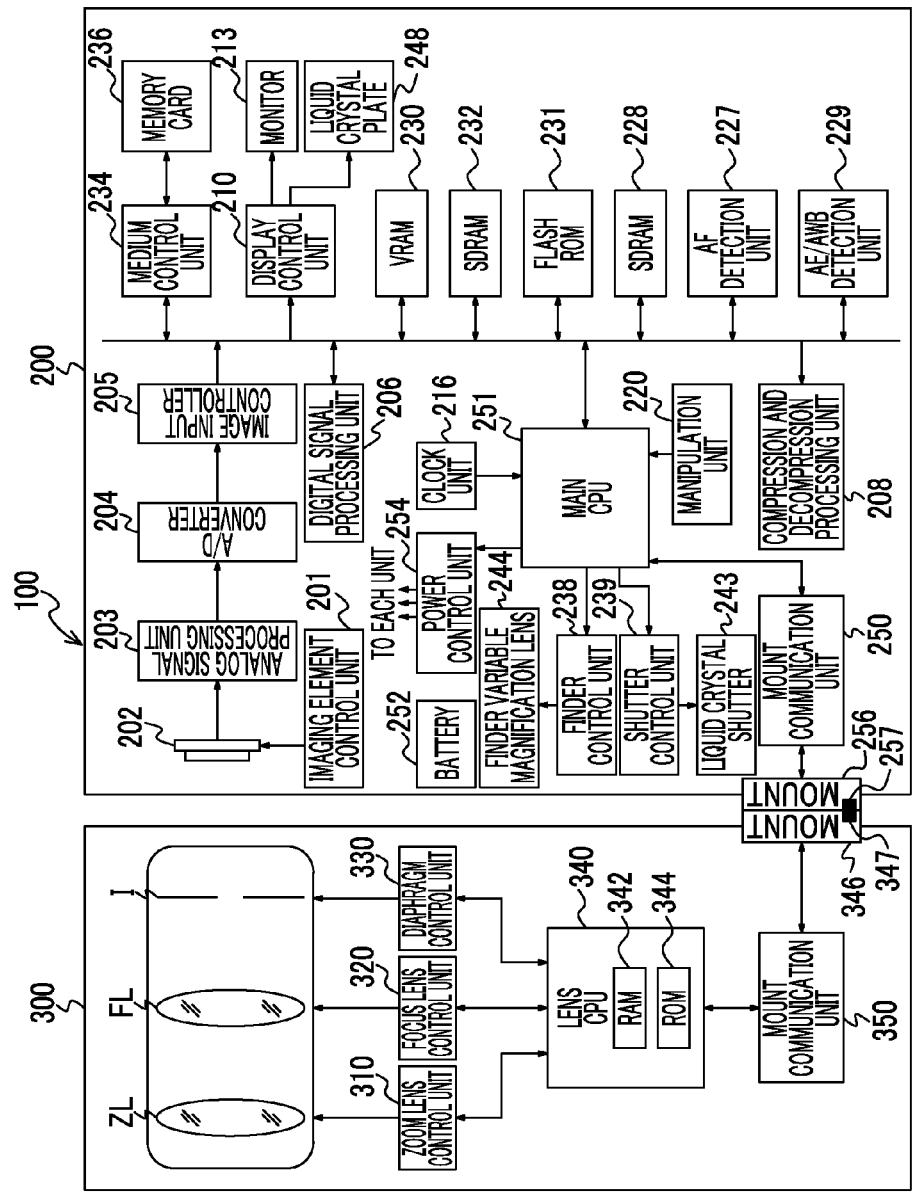
FIG. 2 is a block diagram illustrating a configuration of primary units of the imaging device 100.

FIG. 1 is a front perspective view of an imaging device 100 which is a lens-interchangeable camera (imaging device) according to a first embodiment of the present invention, and FIG. 2 is a block diagram illustrating a configuration of primary units of the imaging device 100. The imaging device 100 includes a camera body (image processing device) 200, and an interchangeable lens 300 (lens device) interchangeably mounted on the camera body 200. The camera body 200 and the interchangeable lens 300 are interchangeably mounted by coupling a mount 256 included in the camera body 200 with a mount 346 on the interchangeable lens 300 side corresponding to the mount 256.

A finder window 241 and a finder switching lever 214, for example, are provided on a front face of the camera body 200, in addition to the mount 256. When the finder switching lever 214 is rotated in an arrow SW direction, an image that can be viewed through the finder is switched between an optical image and an electronic image. Further, an optical axis L2 of the finder is an optical axis different from an optical axis L1 of the interchangeable lens 300. Further, a release button 211, and a dial 212 for photography mode setting are usually provided on an upper face of the camera body 200. Manipulation members constituting a manipulation unit 220, such as a Q button, a cross key, a rotating dial, a MENU/OK key, a DISP/BACK button, and a playback button, are usually provided on a back face of the camera body 200, in addition to a finder eyepiece portion and a monitor 213 (see FIG. 2).

The monitor 213 is not only used for through image display in a photography mode or reproduction image display in a reproduction mode, but also used for display of a list screen in which icons for setting various parameters are arranged in a two-dimensional matrix form.

The finder includes, for example, the finder eyepiece portion, an objective lens, a prism, an eyepiece lens, and a lens for a liquid crystal plate which are not illustrated, in addition to the finder window 241, a liquid crystal shutter 243, a finder variable magnification lens 244, and a liquid crystal plate 248.

The finder variable magnification lens 244 is provided to freely parallel-translate between a position deviated from the optical axis L2 and a position on the optical axis L2, and when a state is shifted from a state in which the finder variable magnification lens 244 is not on the optical axis L2 to a state in which the finder variable magnification lens 244 is on the optical axis L2, the optical image observed from the finder eyepiece portion is expanded.

The liquid crystal shutter 243 is provided on a back surface of the finder window 241 to be perpendicular to an optical axis of subject light incident from the finder window 241. The liquid crystal shutter 243 is a liquid crystal panel including a liquid crystal layer sealed between a pair of substrates, in which a polarization direction is changed by a voltage applied to the liquid crystal layer and, for example, is a liquid crystal panel having resolution of 1600×900 pixels. The liquid crystal shutter 243 is configured to be able to switch a light shielding state in which the subject light incident from the finder window 241 is shielded and a transmission state in which the subject light is transmitted (non-shielding state) under control of a liquid crystal shutter control unit 239. This switching is performed according to the rotation operation of the finder switching lever 214 described above.

The liquid crystal plate 248 is a liquid crystal panel having resolution of 1600×900 pixels which is the same as the display resolution of the liquid crystal shutter 243. A framework showing a photography range that is a range of the subject light incident on a light receiving surface of the imaging element 202 (imaging element) is displayed on the liquid crystal plate 248 based on a focus length (angle of view) of the interchangeable lens 300 under control of a display control unit 210. Further, an image obtained by reversing the subject image or a reverse image of letters and/or signs indicating various photography information (for example, exposure mode, image size, image quality mode, and ISO sensitivity) can also be displayed on the liquid crystal plate 248 under control of the display control unit 210.

FIG. 2 is a block diagram illustrating a configuration of primary units of the imaging device 100. The entire operation of the imaging device 100 is controlled by a main CPU 251 of the camera body 200 and a lens CPU 340 of the interchangeable lens 300.

The main CPU 251 develops a camera control program (including a program for ghost detection and correction process to be described below) stored in a ROM 228 (storage unit) to a SDRAM 232 and executes various processes while using the SDRAM 232 as a work memory. Further, the lens CPU 340 develops a camera control program stored in a ROM 344 to a RAM 342 and executes various processes while using the RAM 342 as a work memory. The SDRAM 232 is used as an area for a calculation task of the main CPU 251 and is also used as a temporary storage area for image data. Further, in the ROM 228, for example, a control program executed by the main CPU 251 and various data necessary for control are stored, and also, lens information (which will be described below) and a threshold for ghost determination are stored in association with each other. Information that is updated with use of the imaging device 100, such as various setting information regarding an operation of the imaging devices 100 such as user setting information, is stored in a flash ROM 231.

When the manipulation unit 220 including, for example, the Q button, the cross key, the rotating dial, the MENU/OK key, and the DISP/BACK button is manipulated by a user, a signal from the manipulation unit 220 is input to the main CPU 251, and the main CPU 251 controls each circuit of the camera body 200 based on the input signal and transmits and receives a signal to and from the interchangeable lens 300 via the mount 256 and a mount communication unit 250, as described below.

A terminal 257 is provided in the mount 256, and a terminal 347 is provided in the mount 346. When the interchangeable lens 300 is mounted on the camera body 200, the terminal 257 and the terminal 347 corresponding to each other come in contact with each other and communication becomes possible (in FIGS. 1 and 2, the terminal 257 and the terminal 347 are conceptually illustrated and positions and the number of terminals in the present invention are not limited thereto). Communication of, for example, a driving instruction, various control statuses (for example, notification of lens driving start/end), and lens information (which will be described below) is performed between the camera body 200 and the interchangeable lens 300. The terminal described above includes, for example, a terminal for ground, a terminal for a synchronization signal, a terminal for serial communication, a terminal of control status communication, and a terminal for power supply from a battery 252 of the camera body 200 to each unit of the interchangeable lens 300.

The interchangeable lens 300 mainly includes a zoom lens ZL, a focus lens FL, a diaphragm I, and the lens CPU 340.

The zoom lens ZL and the focus lens FL move back and forth on the same optical axis, and perform zooming and focusing. The zoom lens ZL is driven by a zoom lens control unit 310 and thereby focus length is changed. The main CPU 251 moves the zoom lens ZL within the interchangeable lens 300 to change the focus length according to a manipulation of a zoom lever (not illustrated) performed by the user. The focus lens FL is driven by a focus lens control unit 320.

The diaphragm I controls an amount of light incident on the imaging element 202 to perform control of the shutter speed and exposure. The diaphragm I, for example, includes five diaphragm blades, and is controlled in six steps with 1 AV increment from an aperture value F1.4 to an aperture value F11. The diaphragm I is driven by a diaphragm control unit 330 to adjust an opening amount.

The lens CPU 340 determines amounts of movement of the zoom lens ZL and the focus lens FL based on current positions in an optical axis direction of the zoom lens ZL and the focus lens FL detected by a position sensor (not illustrated) and lens target positions, and on a lens adjustment value within setting information of the interchangeable lens 300 developed from the ROM 344 to the RAM 342.

The zoom lens control unit 310 moves the zoom lens ZL in the optical axis direction to change photograph magnification according to an instruction from the lens CPU 340. Further, the focus lens control unit 320 moves the focus lens FL back and forth in the optical axis direction to focus on a subject according to an instruction from the lens CPU 340. The diaphragm control unit 330 changes an aperture value of the diaphragm I according to an instruction from the lens CPU 340.

The imaging element 202 is arranged in a subsequent stage of the zoom lens ZL, the focus lens FL and the diaphragm I, and receives the subject light transmitted through the zoom lens ZL, the focus lens FL and the diaphragm I. The imaging element 202 includes a light receiving surface on which a large number of light receiving elements are arranged in a matrix form. The subject light transmitted through the zoom lens ZL, the focus lens FL and the diaphragm I is imaged on the light receiving surface of this imaging element 202, and converted into an electrical signal by each light receiving element. Further, various photoelectric conversion elements such as CMOSs or CCDs may be used as the imaging elements 202.

This imaging element 202 outputs electric charges accumulated in each pixel line by line as a serial image signal in synchronization with a vertical transfer clock and a horizontal transfer clock supplied from an imaging element control unit 201. The main CPU 251 controls the imaging element control unit 201 to control driving of the imaging element 202.

Further, charge accumulation time (exposure time) of each pixel is determined by an electronic shutter driving signal given from the imaging element control unit 201. The main CPU 251 indicates the charge accumulation time to the imaging element control unit 201.

Further, when the imaging device 100 is set to a photography mode, output of an image signal is started so as to display a through image (live view image) on the monitor 213. When an instruction of main photography is performed, such output of the image signal for a through image is stopped, and is started again when main photography ends.

The image signal output from the imaging element 202 is an analog signal, and this analog image signal is input to an analog signal processing unit 203.

The analog signal processing unit 203 includes a correlated double sampling circuit (CDS) and an automatic gain control circuit (AGC). The CDS performs removal of noise contained in the image signal, and the AGC amplifies the image signal subjected to noise removal with a predetermined gain. The analog image signal subjected to required signal processing in the analog signal processing unit 203 is input to an A/D converter 204.

The A/D converter 204 converts the input analog image signal into a digital image signal with a gradation width of predetermined bits. This image signal is so-called RAW data, and has a gradation value indicating density of R, G, and B of each pixel. Further, when the imaging element 202 is an MOS type imaging element, the A/D converter 204 is built in the imaging element 202 in some cases, and the corrected double sampling may not be done.

An image input controller 205 includes a line buffer having a predetermined capacity therein, and accumulates an image signal of one frame output from the A/D converter 204. The image signal of one frame accumulated to the image input controller 205 is stored in the SDRAM 232.

The image signal of one frame stored in the SDRAM 232 is input to a digital signal processing unit 206 in a point-sequential manner (in order of pixels).

The digital signal processing unit (correction unit) 206 performs predetermined signal processing on the image signal of each color of R, G, and B input in a point-sequential manner to generate an image signal (Y/C signal) including a luminance signal Y, and color-difference signals Cr and Cb, and performs a correction process when it is determined that a ghost is generated (which will be described below).

According to an instruction of the main CPU 251, an AF detection unit 227 receives image signals of R, G and B stored in the SDRAM 232, and calculates a focus evaluation value necessary for automatic focus (AF) control. This AF detection unit 227 includes a high-pass filter that allows passage of only a high-frequency component of the G signal, an absolute value calculation processing unit, an AF area extraction unit that extracts a signal within a predetermined focus area (hereinafter referred to as an AF area) set in the screen, and an integration unit that integrates absolute value data within the AF area, and outputs the absolute value data within the AF area integrated in the integration unit to the main CPU 251 as the focus evaluation value. As a scheme of controlling the focus lens FL based on the focus evaluation value, a scheme of searching for a position in which the focus evaluation value is maximized and moving the focus lens FL to the position or a hill climbing scheme of moving the focus lens FL in a direction in which the focus evaluation value increases, and setting a focus lens group in a position of a point at which the focus evaluation value begins to decrease when the point is detected can be used.

As the scheme of controlling the focus lens FL, a phase difference scheme may be used in addition to the scheme described above. When phase difference AF processing is performed, the focus lens FL within the interchangeable lens 300 is controlled so that a focus amount obtained from phase difference data calculated using a pixel having a plurality of phase differences within a predetermined focus area in the image data becomes 0. Further, when the phase difference scheme is used, an imaging element for phase difference AF may be separately arranged and AF may be performed using a phase difference detected by the imaging element for phase difference AF.

An AE/AWB detection unit 229 receives the image signals of R, G and B stored in the SDRAM 232, integrates G signals of the entire screen or integrates G signals differently weighted in a central portion and a peripheral portion of the screen, and outputs an integration value necessary for AE control to the main CPU 251. The main CPU 251 calculates a luminance value from the integration value and obtains an exposure value from the luminance value. Further, the aperture value and the shutter speed are determined from the exposure value according to a predetermined program diagram.

Further, the AE/AWB detection unit 229 divides one screen into a plurality of areas (for example, 16×16) and calculates an average integration value for each color of the image signals of R, and B in each divided area as a physical amount necessary for AWB control. The main CPU 251 obtains ratios of R/G and B/G in each divided area from the integration value of R, the integration value of B, and the integration value of G that have been obtained, and performs a determination of a type of light source based on, for example, a distribution in a color space of R/G and B/G of the obtained R/G and B/G values. Also, the main CPU 251 determines a gain value for the R, G and B signals (white balance correction value) of the white balance adjustment circuit, for example, so that the value of each ratio becomes approximately 1 (that is, an integration ratio of RGB in one screen is R:G:B=1:1:1) according to a white balance adjustment value suitable for the determined type of light source. The AE/AWB detection unit 229 performs white balance adjustment by applying a digital gain according to the type of light source to the image signal of one frame stored in the SDRAM 232, and performs gamma (gradation property) processing and sharpness processing to generate the R, G, and B signals.

A compression and decompression processing unit 208 performs a predetermined compression process on the image data generated by the digital signal processing unit 206 to generate compressed image data according to an instruction from the main CPU 251. Further, a predetermined decomposition process is performed on the compressed image data to generate non-compressed image data.

A medium control unit 234 records the image data obtained by the photography in a memory card 236 or reads the recorded image from the memory card 236 according to an instruction from the main CPU 251.

The display control unit 210 controls display on the monitor 213 and the liquid crystal plate 248 according to an instruction from the main CPU 251.

A finder control unit 238 drives the finder variable magnification lens 244 to perform insertion or removal on the optical axis of the finder variable magnification lens 244.

The liquid crystal shutter control unit 239 controls light shielding and non-light shielding states of the liquid crystal shutter 243.

The camera body 200 and the interchangeable lens 300 perform communication via the mount 246 (lens information acquisition unit) and the mount communication unit 250 (lens information acquisition unit) of the camera body 200, the mount 346 (lens information acquisition unit) and a mount communication unit 350 (lens information acquisition unit) of the interchangeable lens 300, and terminals (lens information acquisition unit) provided in the mount 246 and the mount 346. Various instructions such as a lens movement instruction or a diaphragm change instruction and responses thereto, various control statuses, and a lens information transmission instruction and lens information as a response thereto, for example, are transmitted and received.

<Functional Configuration of Main CPU 251>

Various functions of the imaging device 100 are mainly performed under control of the main CPU 251, and the main CPU 251 has the following functions to perform such control.

Figure 3:
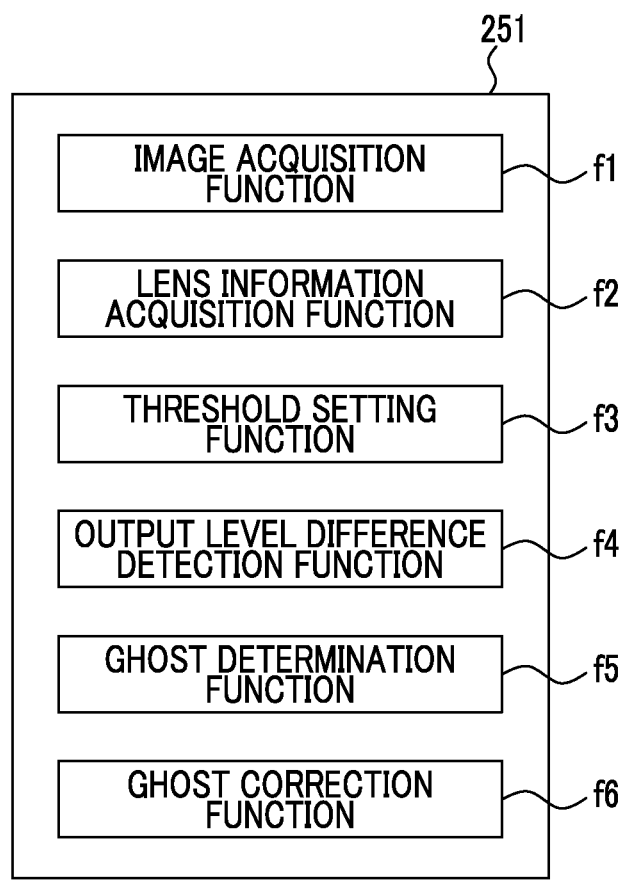
FIG. 3 is a functional block diagram of a main CPU 251.

FIG. 3 is a block diagram illustrating functions regarding ghost detection and correction among the functions of the main CPU 251, and the main CPU 251 has functions f1 to f6, as illustrated in FIG. 3. Hereinafter, each function will be schematically described.

An image acquisition function f1 is a function of controlling, for example, the imaging element 202 or the interchangeable lens 300 to acquire a captured image.

A lens information acquisition function (lens information acquisition unit) f2 is a function of performing communication via the mount 246 and the mount communication unit 250 of the camera body 200, the mount 346 and the mount communication unit 350 of the interchangeable lens 300, and the terminals provided in the mount 246 and the mount 346 to acquire lens information containing, for example, a lens type, an aperture value, a focus position, and a zoom position of interchangeable lens 300.

A threshold setting function (determination unit) f3 is a function of setting a threshold for ghost determination by referring to the ROM 228 based on the lens information acquired using the lens information acquisition function f2.

An output level difference detection function (determination unit) f4 is a function of detecting an output level difference between the same color pixels having a different underlayer layout in the imaging element 202, and a ghost determination function (determination unit) f5 is a function of determining whether a ghost is generated based on the detected output level difference and the set threshold.

A ghost correction function (correction unit) f6 is a function of correcting the generated ghost so as not to stand out using the digital signal processing unit 206.

<Characteristics of the Color Filter Array>

In the first embodiment, the color filter array of the imaging element 202 has the following characteristics (1), (2), (3), (4) and (5).

[Characteristic (1)]

Figure 4:
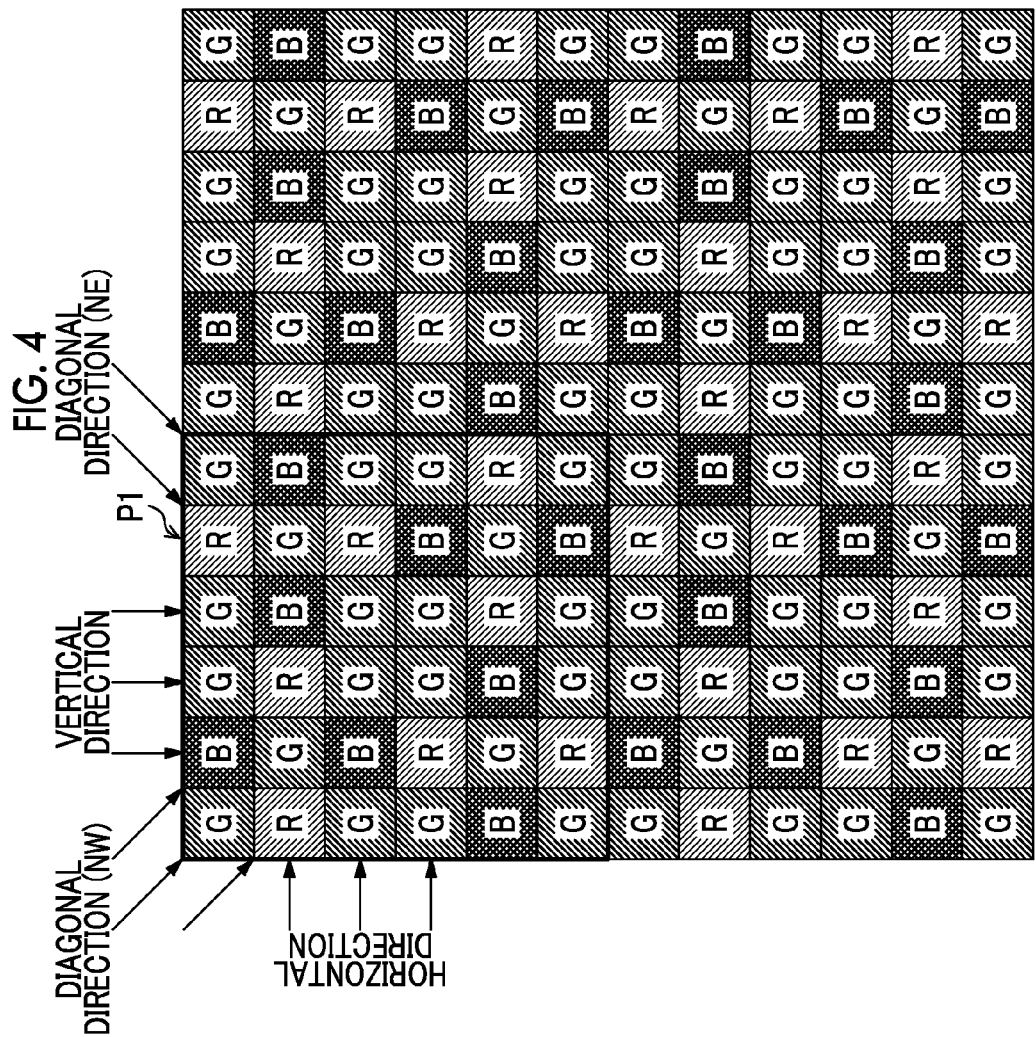
FIG. 4 is a diagram illustrating a single-plate type imaging element according to a first embodiment of the present invention.

A color filter array illustrated in FIG. 4 includes a basic array pattern P1 (a pattern indicated by a bold frame) including a square array pattern corresponding to 6×6 pixels, and this basic array pattern P1 is repeatedly arranged in a horizontal direction and a vertical direction. That is, in this color filter array, filters (an R filter, a G filter, and a B filter) of respective colors of R, G and B are arranged in a predetermined period.

Since the R filter, the G filter, and the B filter are arranged in a predetermined period in this way, a process can be performed according to a repetitive pattern when, for example, a synchronization (interpolation) process of the R, G, and B signals read from the imaging element is performed.

Further, when an image is reduced through a decimation process in units of basic array patterns P1, a color filter array of the reduced image subjected to the decimation process can be the same as the color filter array before the decimation, and a common processing circuit can be used.

[Characteristic (2)]

In the color filter array illustrated in FIG. 4, the G filter corresponding to a color (in this embodiment, the color of G) contributing most to obtaining a luminance signal is arranged in each of the lines in the horizontal, vertical, upper right diagonal (NE) and upper left diagonal (NW) directions of the color filter array.

Since the G filter corresponding to a luminance-based pixel is arranged in each of the lines in the horizontal, vertical, upper right diagonal (NE) and upper left diagonal (NW) directions of the color filter array, it is possible to improve reproduction precision of the synchronization process in a high frequency area regardless of the direction of a high frequency.

[Characteristic (3)]

In the basic array pattern of the color filter array illustrated in FIG. 4, the numbers of R, G and B pixels corresponding to the R, G, and B filters within the basic array pattern are 8, 20, and 8. That is, a ratio of the numbers of the RGB pixels is 2:5:2, and the percentage of the number of G pixels contributing most to obtaining a luminance signal is higher than those of the R pixels and the B pixels of the other colors.

As described above, since the percentages of the number of G pixels and the number of R and B pixels differ, and particularly, the percentage of the number of G pixels contributing most to obtaining a luminance signal is greater than those of the R and B pixels, it is possible to suppress aliasing in the synchronization process and to perform high frequency reproduction well.

[Characteristic (4)]

In the color filter array illustrated in FIG. 4, one or more R filters and one or more B filters corresponding to two or more other colors (colors of R and B in this embodiment) other than the color G are arranged in each of the lines in the horizontal and vertical directions of the color filter array within the basic array pattern P1.

Since the R filters and the B filters are arranged in each of the lines in the horizontal and vertical directions of the color filter array, it is possible to suppress generation of color moire (false color). Accordingly, it is unnecessary to arrange an optical low pass filter for suppressing generation of the false color in the optical path from the incidence surface to the imaging surface of the optical system, or it is possible to apply an optical low pass filter in which a function of cutting a high frequency component for preventing generation of the false color is weak when the optical low pass filter is applied, thereby preventing degradation of resolution.

Figure 5:
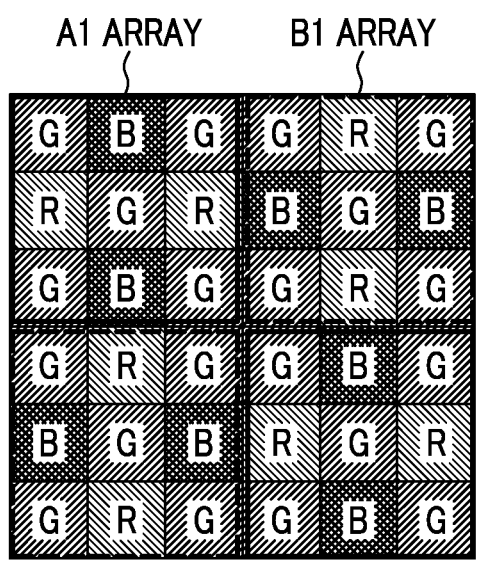
FIG. 5 is a diagram illustrating a basic array pattern included in a color filter array of the imaging element of the first embodiment.

FIG. 5 illustrates a state in which the basic array pattern P1 illustrated in FIG. 4 is divided in 4 into 3×3 pixels.

The basic array pattern P1 can be understood to be an array in which an A1 array of 3×pixels surrounded by a frame indicated by a solid line and a B1 array of 3×pixels surrounded by a frame indicated by a dashed line are alternately arranged in horizontal and vertical directions, as illustrated in FIG. 5.

In the A1 array and the B1 array, the G filter which is a luminance-based pixel is arranged at four corners and a center so as to be arranged on two diagonal lines. Further, in the A1 array, the R filter is arranged in the horizontal direction with the G filter at the center interposed between the R filters, and the B filter is arranged in the vertical direction with the G filter at the center interposed between the B filters, whereas in the B1 array, the B filter is arranged in the horizontal direction with the G filter at the center interposed between the B filters, and the R filter is arranged in the vertical direction with the G filter at the center interposed between the R filters. That is, a positional relationship between the R filter and the B filter is reversed between the A1 array and the B1 array, but other arrangements are the same.

Figure 6:
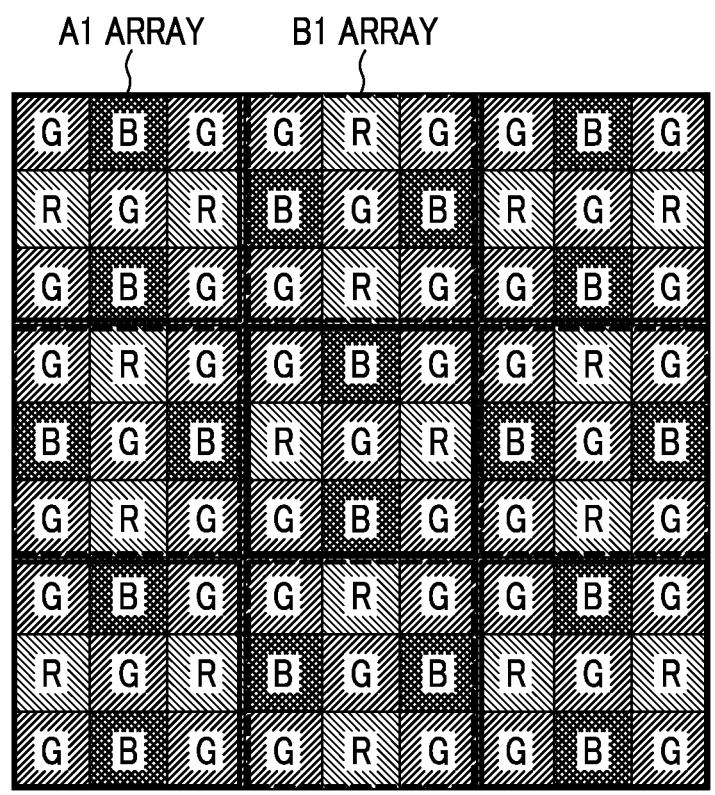
FIG. 6 is a diagram illustrating a state in which the basic array pattern of 6×6 pixels included in the color filter array of the imaging element of the first embodiment is divided into an A array and a B array of 3×3 pixels and the arrays are arranged.

Further, the G filters at the four corners of the A1 array and the B1 array are the G filters in a square array corresponding to 2×2 pixels by the A1 array and the B1 array being alternately arranged in the horizontal and vertical directions, as illustrated in FIG. 6.

This is because the G filter which is a luminance-based pixel is arranged at the four corners and the center in the 3×3 pixels in the A1 array or the B1 array, and these 3×3 pixels are alternately arranged in the horizontal and vertical directions to form the G filters in the square array corresponding to the 2×2 pixels. Further, with such an array, the characteristics (1), (2), and (3) described above and a characteristic (5) to be described below are satisfied.

[Characteristic (5)]

The color filter array illustrated in FIG. 4 includes the square array corresponding to the 2×2 pixels including the G filters.

Figures 7A, 7B:
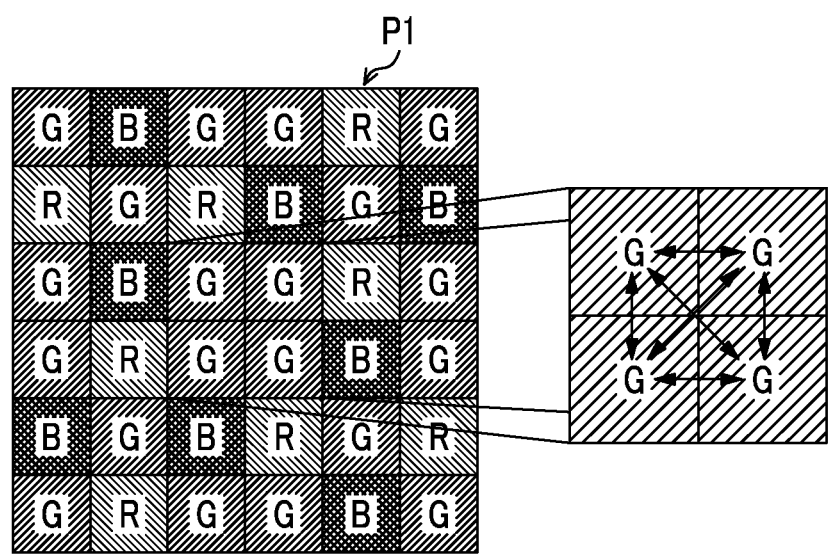
FIGS. 7A and 7B are diagrams used to illustrate a method of determining a correlation direction from a pixel value of a G pixel of 2×2 pixels included in the color filter array of the imaging element of the first embodiment.

It can be determined that there is an association in a direction in which the absolute value of the difference is small among the horizontal direction, the vertical direction, and the diagonal direction by extracting the 2×2 pixels (see FIG. 7B) including the G filters from the basic array pattern P (see FIG. 7A) and obtaining the absolute value of the difference between the pixel values of the G pixels in the horizontal direction, the absolute value of the difference between the pixel values of the G pixels in the vertical direction, and the absolute value of the difference between the pixel values of the G pixels in the diagonal direction (upper right diagonal and upper left diagonal directions).

That is, according to this color filter array, it is possible to determine a direction in which the association is high among the horizontal direction, the vertical direction, and the diagonal direction using information of the G pixels at a minimum pixel interval. A result of this direction determination can be used for an interpolation process from adjacent pixels (synchronization process).

Further, as illustrated in FIG. 6, when the pixels of the A1 array or the B1 array of 3×3 pixels are synchronization process target pixels and 5×5 pixels (a local area of a mosaic image) based on the A1 array or the B1 array are extracted, there are the G pixels of 2×2 pixels at four corners of the 5×5 pixels. By using the pixel values of such G pixels of the 2×2 pixels, it is possible to accurately perform the determination of a correlation direction for four directions using the information of the G pixels at a minimum pixel interval.

[Characteristic (6)]

The basic array pattern of the color filter array illustrated in FIG. 4 is point-symmetrical to a center (a center of four G filters) of the basic array pattern. Further, the A1 array and the B1 array in the basic array pattern are also point-symmetric to the G filter at the center, as illustrated in FIG. 5.

According to such symmetry, it is possible to reduce or simplify a circuit scale of the processing circuit in a subsequent stage.

Figure 8:
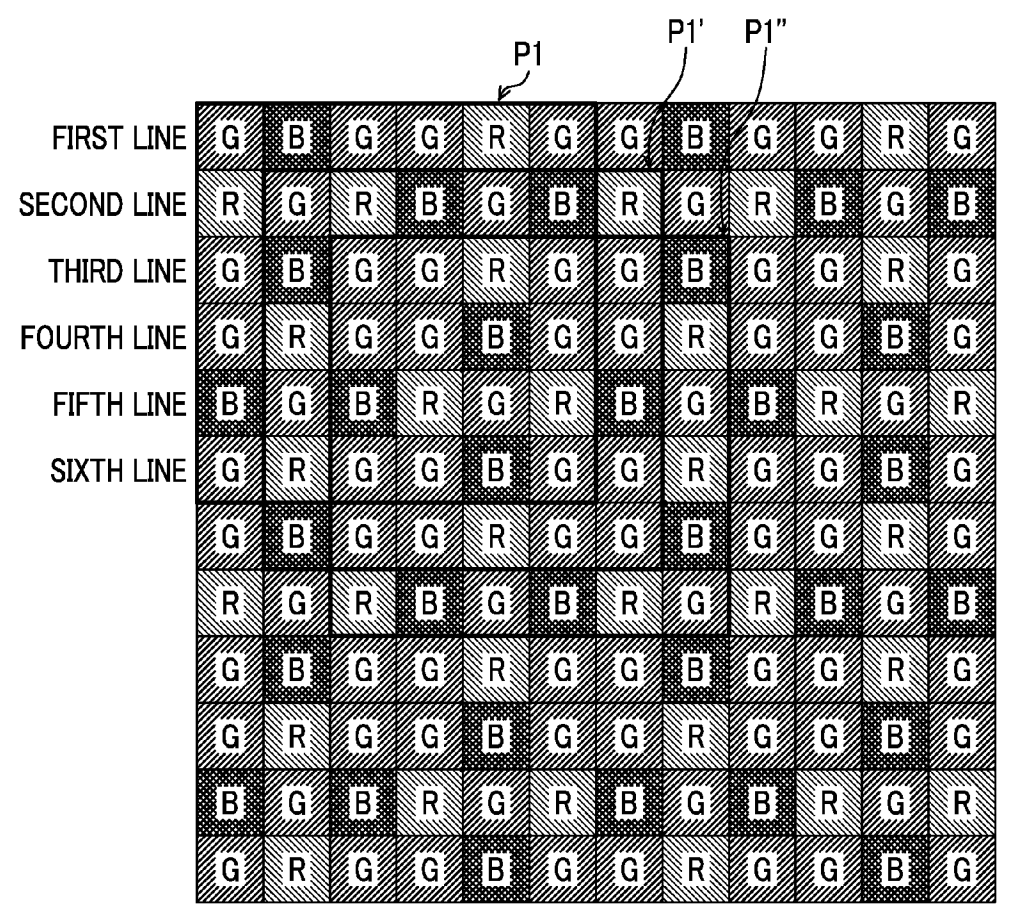

As illustrated in FIG. 8, in a basic array pattern P1 indicated by a bold frame, a color filter array of first and third lines among first to sixth lines in a horizontal direction is GBG-GRG, a color filter array of the second line is RGRBGB, a color filter array of the fourth and sixth lines is GRGGBG, and a color filter array of the fifth line is BGBRGR.

Then, in FIG. 8, if a basic array pattern obtained by shifting the basic array pattern P1 by one pixel in the horizontal and vertical directions is P1' and a basic array pattern obtained by shifting the basic array pattern P1 by two pixels is P1", the same color filter array is obtained even when the basic array patterns P1' and P1" are repeatedly arranged in the horizontal and vertical directions.

That is, as the basic array pattern is repeatedly arranged in the horizontal and vertical directions, there are a plurality of basic array patterns capable of constituting the color filter array illustrated in FIG. 8. In the first embodiment, the basic array pattern P1 in which the basic array pattern is point-symmetric is referred to as a basic array pattern, for convenience.

Thus, in the imaging device 100 according to the present embodiment, since the imaging element 202 on which the color filters in the color filter array as in FIGS. 4 to 8 are mounted is used, it is possible to reduce generation of color moire (false color) without the optical low pass filter (LPF) even when the high frequency pattern is included in the subject.

Further, a form in which the function of the low-path filter is reduced or a form in which the function is suppressed, not a form in which such an optical low pass filter is not provided, may be adopted.

<Configuration of Imaging Element and Generation of Ghost>

Figure 10:
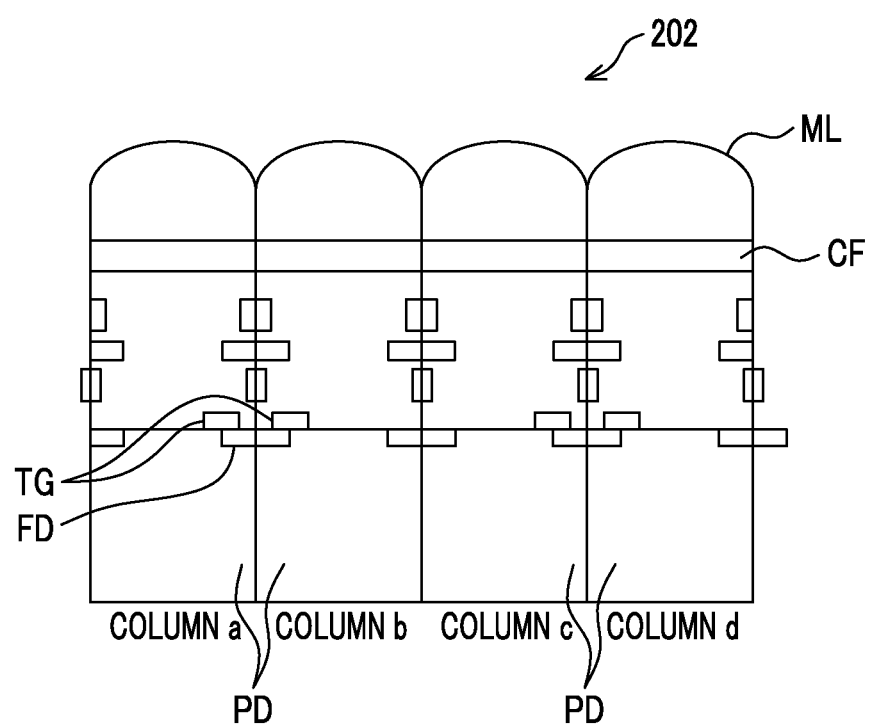
FIG. 10 is a diagram illustrating the structure of an imaging element 202.

Next, a configuration of the imaging element 202 and generation of a ghost caused by the configuration will be described. FIG. 9A is a diagram illustrating an array of color filters CF of the imaging element 202, and FIG. 10 is a diagram illustrating a cross-section of the imaging element 202. In the color filters CF, the respective red (R), green (G), and blue (B) are arranged as a repetition of a basic array pattern of 6 pixels×6 pixels, as illustrated in FIG. 4A. In this basic array pattern, a color filter array of first and third lines (lines a and c) among first to sixth lines in a horizontal direction is GBGGRG, a color filter array of the second line (line b) is RGRBGB, a color filter array of the fourth and sixth lines (lines d and f) is GRGGBG, and a color filter array of the fifth line (line e) is BGBRGR.

In the imaging element 202, a microlens ML and the color filter CF are arranged for each pixel, and an element TG (transfer gate) for performing transfer of charge, and a floating diffusion (FD) are arranged on a photodiode (PD) that performs photoelectric conversion of incident light, as illustrated in FIG. 10. Here, a layout of an underlayer (TG and FD in the example of FIG. 10) differs in lines a and b, and lines c and e have the same layout as line a, and lines d and f have the same layout as line b. Such a pattern is repeatedly arranged to constitute the imaging element 202. Further, while the case of the imaging element having the color filter array illustrated in, for example, FIGS. 4 to 8 and FIG. 9 is described in the present embodiment, the image processing device, the imaging device, and the image processing method of the present invention are not limited to the case of the imaging element having the color filters of the type illustrated in said figures, and is similarly applicable to a case of a configuration in which effects of an optical low pass filter in an imaging element including color filters in a Bayer array in the related art have been reduced or a configuration in which the effects have been suppressed.

FIG. 12A is a diagram illustrating a state of incidence of the ghost light in the imaging element 202 having the above configuration. In the case of a configuration of FIG. 12A, in line a, ghost light G is incident on the photodiode PD and an output level becomes high, whereas in line b, the ghost light G is blocked by the transfer gate TG and the output level becomes lower than in line a. Such a situation similarly occurs in lines c and d, and lines e and f. Therefore, lines (lines a, c and e) in which the output becomes high when the ghost light G is incident on the imaging element 202, and lines (lines b, d and f) in which the output becomes low are alternately generated as in FIG. 9B, and an output step appears in a striped form in the captured image.

Figure 11:
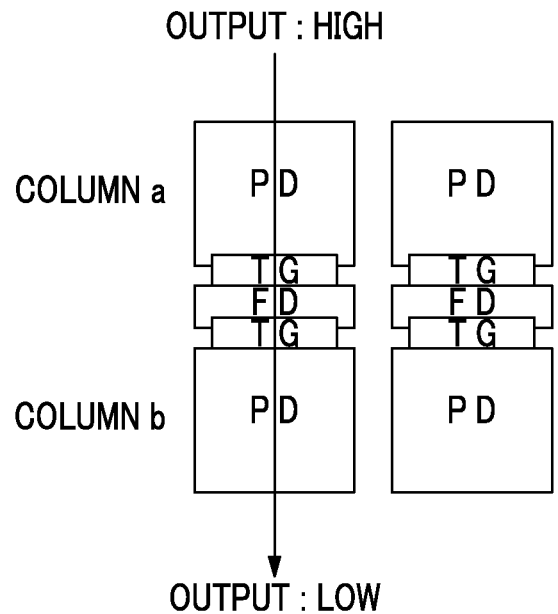
FIG. 11 is a diagram illustrating a state of pixels sharing an underlayer in the imaging element 202, and a direction in which an output level difference is generated between the pixels sharing the underlayer.

Further, in FIG. 12A, since the case in which the ghost light G is incident from the right side of FIG. 12A is described, the output level of line a is high and the output level of line b is low. On the other hand, when the ghost light G is incident from the left side of the FIG. 12A, a relationship of the output level is reversed. Further, in the example illustrated in FIG. 12A, since adjacent pixels share the underlayer in an up and down direction (vertical direction) as in lines a and b, the difference in the output level is generated in the up and down direction (vertical direction) of the FIG. 11, as illustrated in FIG. 11, whereas when the imaging element 202 shares the underlayer in a rightward and leftward direction (horizontal direction) as in the example illustrated in FIG. 17, the difference in the output level is generated in the rightward and leftward direction of FIG. 17 (a horizontal direction: for example, between line 1 and line 2 in FIG. 17), and an output step appears in a striped form in the captured image.

<Incidence Angle of Ghost Light and Output Level Difference>

Figure 13:
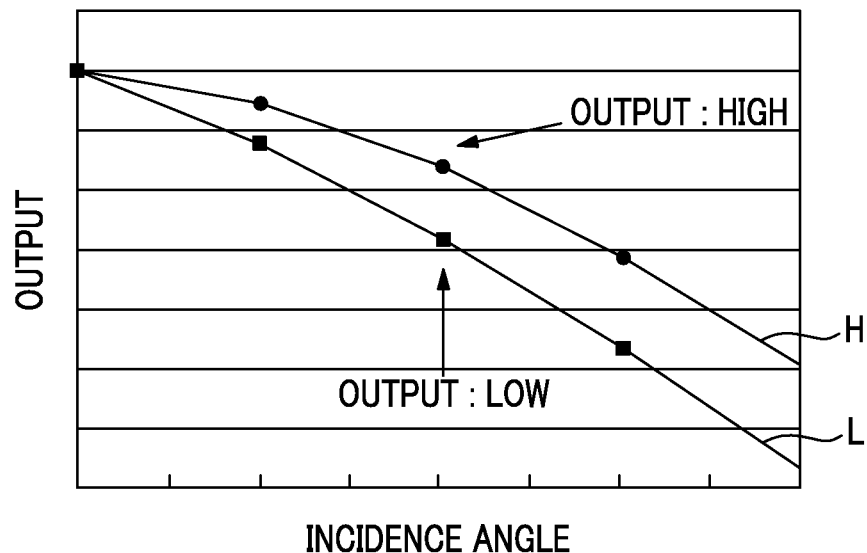
FIG. 13 is a diagram illustrating relationship between an incidence angle of ghost light and an output level in the imaging element 202.

A difference (step) in the output level due to the difference in the underlayer layout described above depends on the incidence angle of the ghost light G, in addition to the configuration of the imaging element 202. FIG. 13 is a diagram illustrating an example of a relationship between an incidence angle (an angle formed with respect to the optical axis direction) of the ghost light G and the output level, and illustrates a state in which the output increases in a pixel in which the ghost light G is incident on the photodiode PD as in line a (curve H), and the output decreases in a pixel in which the ghost light G is blocked by the TG as in line b (curve L). A difference between the curve H and the curve L corresponds to the difference in output level.

<Setting of Threshold for Output Level Difference>

Figure 14:
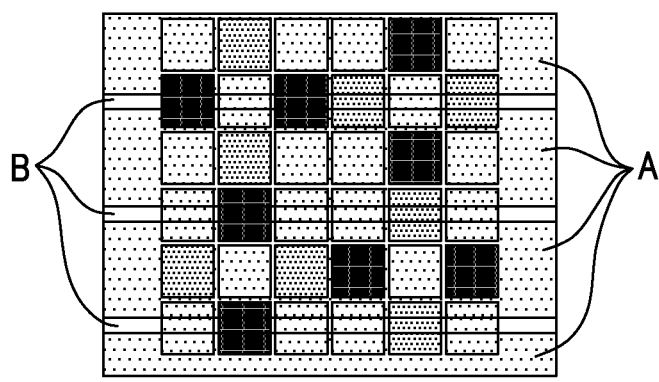
FIG. 14 is a diagram illustrating a state in which a difference in the output level is generated between adjacent lines of the imaging element 202 due to the shape of a subject.

In such a situation, when determination of ghost generation is performed based on only the output level difference (step), it is erroneously determined that the ghost is generated and inappropriate correction is performed even when the output level difference is generated due to a light and shade pattern of a subject as illustrated in FIG. 14. Therefore, in the imaging device 100 according to the present embodiment, an upper limit of the output level difference is set as a threshold, and it is determined that the ghost is generated when the output level difference differs within a range in which the output level difference does not exceed this threshold, as will be described below. Specifically, since the output level difference (step) can be predicted based on conditions such as the configuration or a component difference of the imaging element 202, characteristics or a usage situation (for example, an aperture value, a zoom position, and a focus position) of the interchangeable lens 300, or an upper limit of the predicted output level difference are set as the threshold. The output level difference equal to or less than the threshold is recognized as being caused by the ghost, and the correction is performed. The output level difference exceeding the threshold is recognized as being caused by the pattern of the subject, and the correction is not performed. Accordingly, in the imaging device 100, it is possible to prevent a false determination of the ghost generation and appropriately perform the detection and correction of the ghost.

Further, in the imaging device 100 according to this embodiment, while such a threshold is set for each color of the color filter CF and the process of detecting and correcting the ghost is performed for each color, the threshold may be set for only a specific color (for example, the G pixel of which the number is greatest), and it may be recognized that the ghost is also generated for other colors and the correction may be performed when it is determined that the ghost is generated for the specific color.

<Details of Threshold Setting>

While the threshold described above may be set to a constant value, the threshold can be set to a value according to several conditions such that the detection and correction of the ghost can be performed more appropriately. Hereinafter, details of such a threshold setting will be described.

Setting of Threshold According to Pixel Position

Figure 15A:
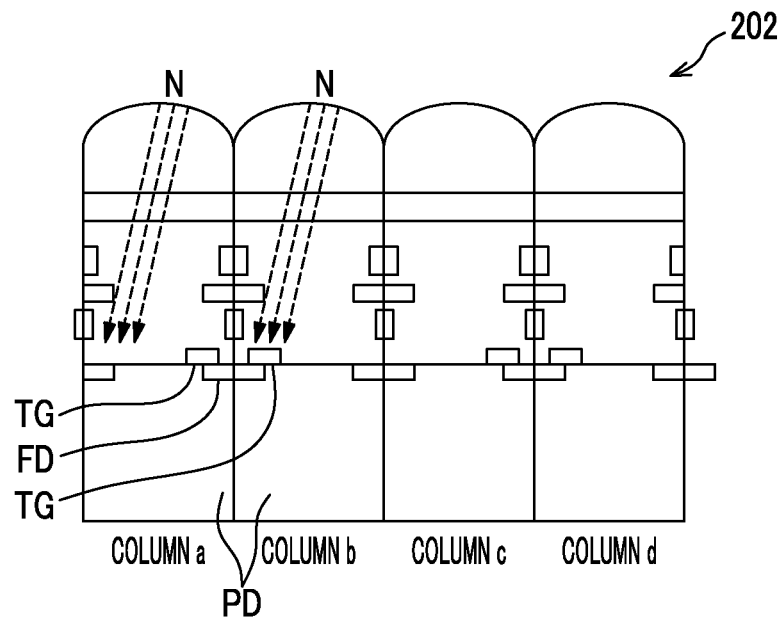
FIGS. 15A and 15B are diagrams illustrating a state in which an incidence angle of normal light is different in a central portion and a peripheral portion of the imaging element 202.
Figure 15B:
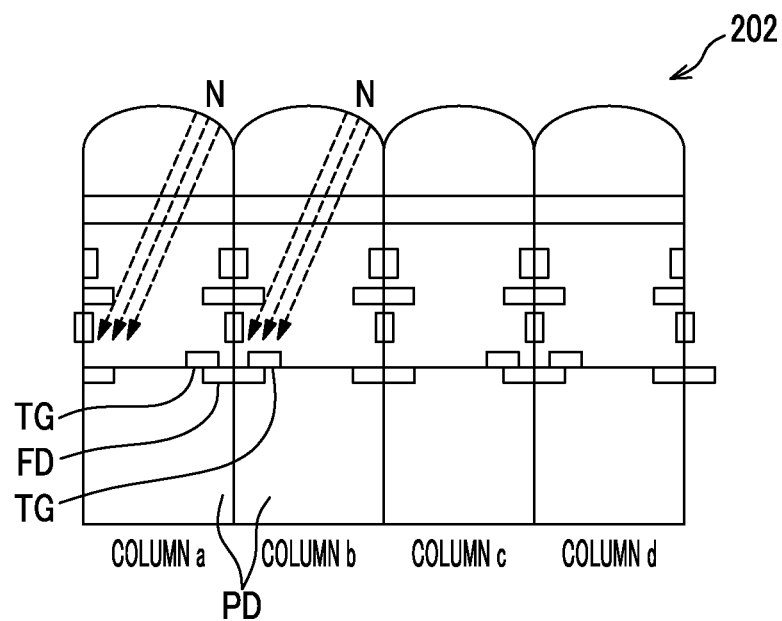
Figures 16, 17:
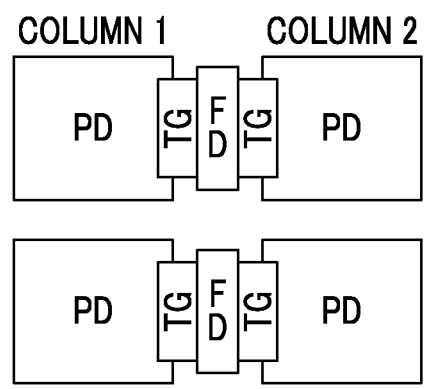
FIG. 16 is a diagram illustrating a threshold in each pixel position of a captured image.
FIG. 17 is a diagram illustrating a state in which an underlayer is shared between pixels in a horizontal direction between adjacent lines of the imaging element 202.

In a peripheral portion of the imaging element, an incidence angle of normal light other than that of the ghost differs, unlike the incidence angle in a central portion. The normal light is generally incident from a diagonal direction in the peripheral portion. FIGS. 15A and 15B is a diagram illustrating such a situation, and FIG. 15A illustrates incidence of normal light N in a portion near a center of the imaging element 202, and FIG. 15B illustrates incidence of the normal light N in a portion near the periphery of the imaging element 202. As in FIG. 15B, when the incidence angle is great, the degree of blocking of the incident light by, for example, the TG is vastly different between the respective lines of the imaging element 202, and a step having a certain size is generated according to the normal light in the peripheral portion. Thus, it is possible to decrease the probability of improper correction by setting the threshold in the screen peripheral portion to a greater value than that in the central portion. An example of such a threshold setting is illustrated in FIG. 16. An example in which a value (4% in the screen central portion and 5.5% in the peripheral portion) which is a % (percentage) representation of the difference in the output level between the same color pixels in the adjacent lines is set as the threshold is illustrated in FIG. 16.

Here, the difference between the output levels depends on, for example, a component difference, and lens information (for example, a lens type, aperture value (F value), a zoom position, and a focus position) of the imaging element 202, as well as a pixel position. Therefore, in the imaging device 100, the thresholds illustrated in FIG. 16 are stored in association with these conditions in the ROM 228, and an appropriate threshold is acquired according to the conditions from the ROM 228 to perform a determination regarding ghost generation.

<Ghost Detection and Correction Process>

Figure 18:
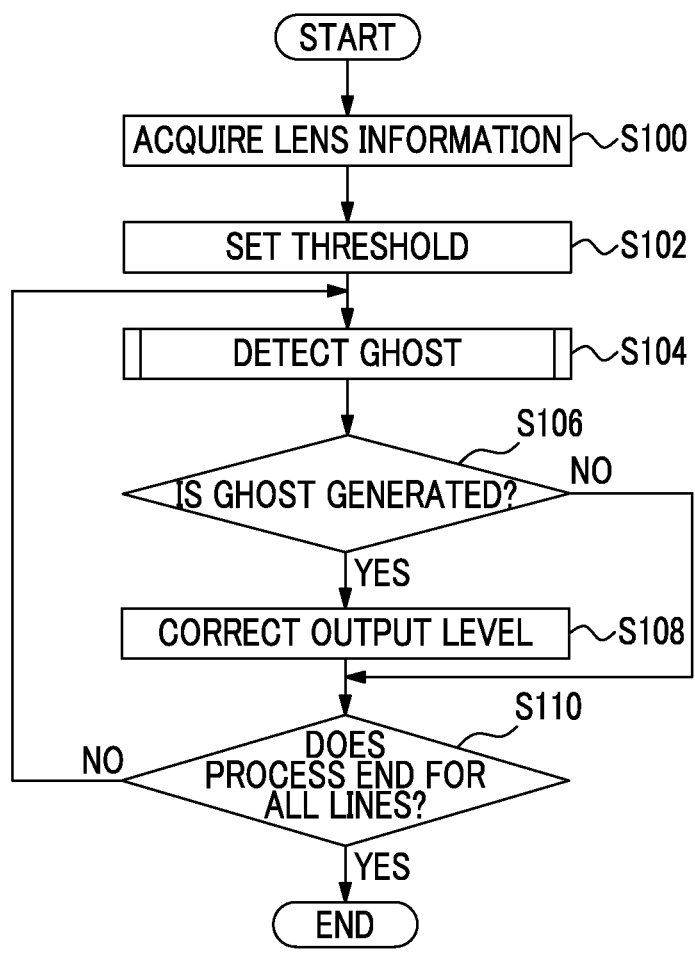
FIG. 18 is a flowchart illustrating a ghost detection and correction process in the imaging device 100.

FIG. 18 is a flowchart illustrating a procedure of the ghost detection and correction process. When the process starts, the camera body 200 and the interchangeable lens 300 first perform communication through the mounts 256 and 346 and the terminals 257 and 347 to acquire lens information of the interchangeable lens 300 (S100). The "lens information" acquired here includes a lens type, an aperture value (F value), a zoom position, and a focus position. Then, the threshold of the output level difference is set by referring to the ROM 228 based on the acquired lens information (S102). The threshold set here is a value according to the component difference, the lens information, and the pixel position of the imaging element 202, as described above.

When the threshold is set in S102, detection of the ghost is performed based on the threshold (S104). When it is determined that the ghost is generated (Yes in S106), the process proceeds to S108 to correct the output level. When it is determined that the ghost is not generated (No in S106), the process proceeds to S110. Such a process is repeated for all the lines of the imaging element 202 (until an answer is Yes in S110). Further, the correction of the output level in S108 can be performed by decreasing a higher output level by a lower output level in the pixels that are comparison targets. This is to cause the ghost not to stand out in consideration of the fact that influence of the ghost light appears as an increase in output level. However, the correction of the output level is not limited to such an aspect and may be performed, for example, by averaging or smoothing the output level.

Figure 12:
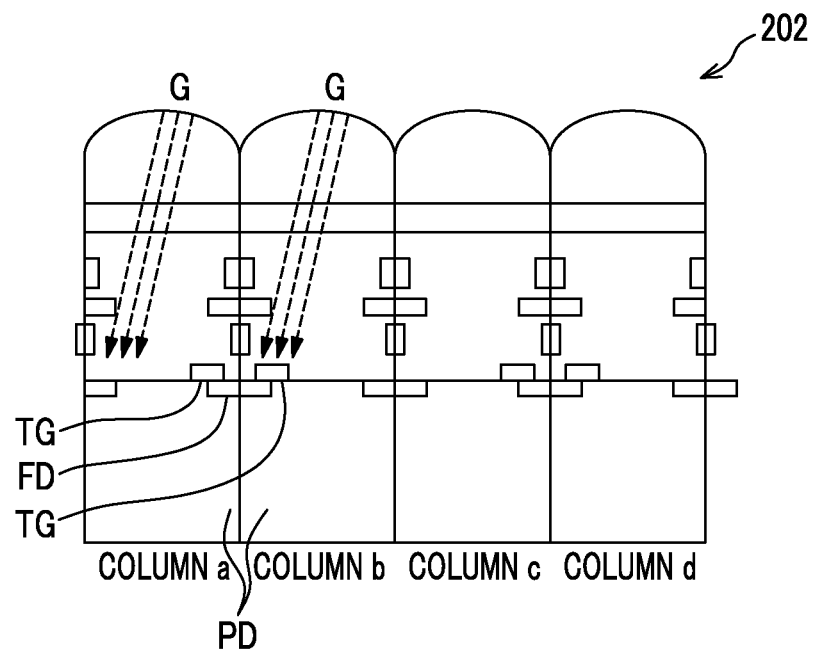
FIG. 12 is a diagram illustrating a state in which an output level difference is generated between adjacent lines due to ghost light in the imaging element 202.
Figure 19:
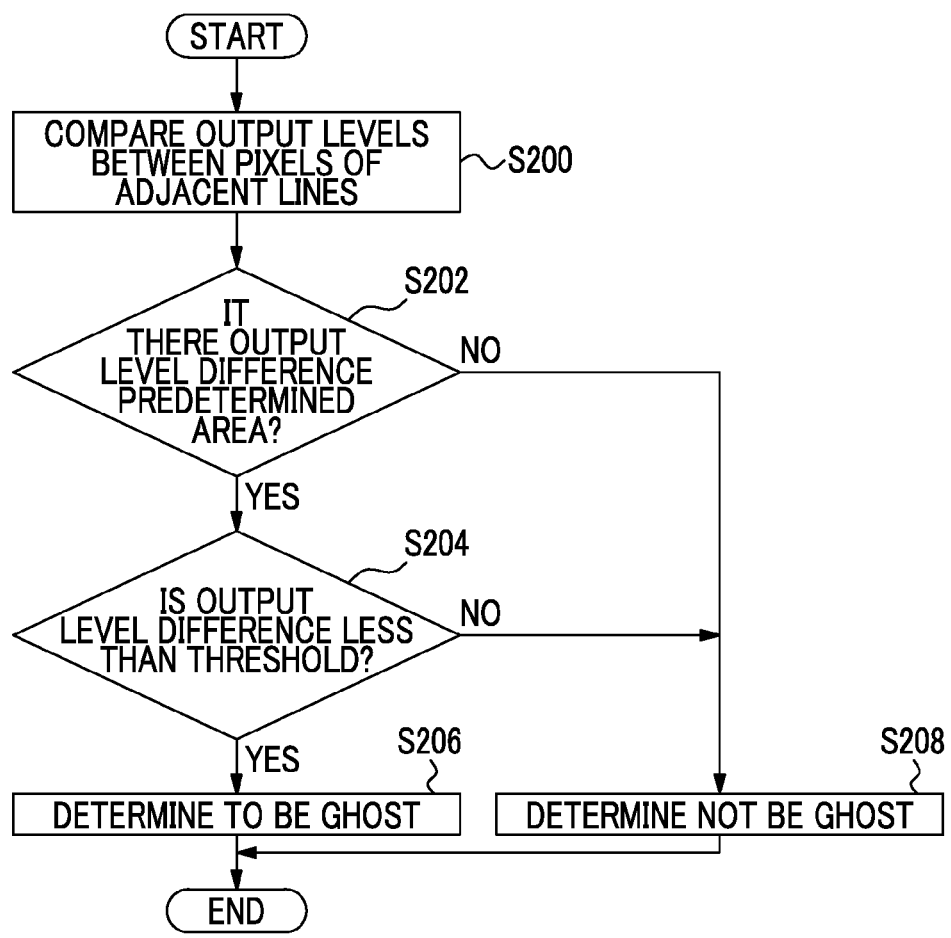
FIG. 19 is a flowchart illustrating details of a ghost detection process.

FIG. 19 is a flowchart illustrating details of the ghost detection process in S104 of FIG. 12. First, in S200, output levels are compared between the same color pixels of the adjacent lines. In the imaging element 202, since the underlayer layout differs between the adjacent lines as illustrated in, for example, FIG. 5, a determination can be made as to whether the ghost is generated by comparing the output levels between the adjacent lines. Specifically, the output levels of the G pixel of line (a, 1) and the G pixel of line (b, 2) of FIG. 4A are compared. Since, for the R pixel and the B pixel, the same color pixels are not adjacent in vertical, horizontal and diagonal directions, for example, the pixel of line (a, 5) and the pixel of line (b, 3) are compared for the R pixel, and for example, the pixel of line (a, 2) and the pixel of line (b, 4) are compared for the B pixel. The comparison of the output levels is not limited to the pixels adjacent in the vertical, horizontal and diagonal directions in this way, and pixels in the vicinity among the same color pixels having a different underlayer layout may be compared. In this case, since influence of the ghost light differs when a distance between pixels is greater, it is preferable to compare pixels as closely as possible.

In S202, a determination is made as to whether an output level difference is generated in a predetermined area. This is in light of circumstances in which the ghost is generated not only in a specific line of the imaging element, but also in a certain range. The size of an area in which the determination of S202 may be made is not particularly limited. However, for example, if there is a step in three sets of lines a and b, lines c and d, and lines e and f within the 6×6 array pattern of FIG. 9A, the ghost may be determined to be generated in the area. When an answer is Yes in S202, the process proceeds to S204 in which a determination is made as to whether the detected output level difference is equal to or less than the threshold set as described above. If the output level difference is equal to or less than the threshold (Yes in S204), an output step is determined to be caused by the ghost light (S206), and if the output level difference exceeds the threshold (No in S204), an output step is determined to be caused by a shape and/or a pattern of the subject, not the ghost light (S208), and the process returns to the flow of FIG. 18. Even when the answer is No in S202, it is determined that the ghost is not generated, and the process returns to the flow of FIG. 18.

Further, in the detection process, it is possible to detect generation of the ghost with high precision by comparing an average integrated value obtained by integrating and averaging the output levels from the same color pixels with the threshold within each area obtained by dividing an imaging surface into a plurality of (for example, 16×16=256) areas. An example of the process within such an area will be described below. FIG. 20 is a diagram illustrating a state of the process in the area of 6 pixels×6 pixels.

When a difference between output levels in even rows (rows 0, 2 and 4) and odd rows (rows 1, 3 and 5) is generated due to ghost light within the area of FIG. 20, if the output levels of the respective pixels G22, G32, G23, and G33 are considered to be corrected, the output levels of these pixels are corrected when the following expression is satisfied.

$$|(\text{average integration of even row output levels}) - (\text{average integration of odd row output levels})| < \text{threshold}$$

$$\text{where the average integration of the even row output levels} = (G00+G20+G30+G50+G02+G22+G32+G52+G14+G44)/10, \text{ and}$$

$$\text{the average integration of the odd row output levels} = (G11+G41+G03+G23+G33+G53+G05+G25+G35+G55)/10. \quad [\text{Expression 1}]$$

For example, when the output level of the even row is high and the output levels of the pixels G22 and G32 are to be corrected, the following expression is satisfied, and a value of Sub is subtracted from the output levels of the pixels G22 and G32. Accordingly, the output level of an even row of which the output level is high is decreased according to the odd row, an output level difference generated between the even row and the odd row is reduced, and the step does not stand out in the captured image. The same process can apply to a case in which a difference in the output level is generated between the even columns (columns 0, 2 and 4) and the odd columns (columns 1, 3 and 5).

$$\text{Sub} = (\text{average integration of even row output levels}) - (\text{average integration of odd row output levels}) \quad [\text{Expression 2}]$$

Further, while the case in which the process is performed in the area of 6 pixels×6 pixels has been described in the example above, it is preferable to extend the area in which the process is to be performed, to 8 pixels×8 pixels or 10 pixels× 10 pixels when an error component caused by noise increases.

<Timing of Ghost Detection and Correction>

Figure 21:
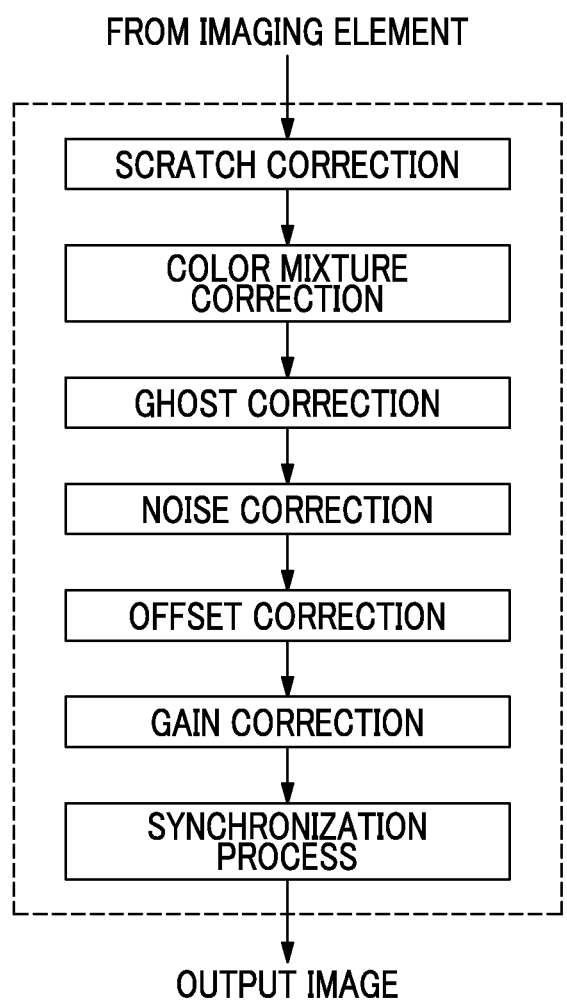
FIG. 21 is a diagram illustrating a timing of a ghost detection and correction process.

FIG. 21 is a diagram illustrating timing of the ghost detection and correction process. In the imaging device 100 according to the present embodiment, ghost detection determination and correction are performed by each function of the main CPU 251, and the digital signal processing unit 206 after scratch correction and color mixture correction of the signal output from the imaging element 202 is performed and before correction for removing noise of the signal is performed. The reason for the determination and the correction at such timing is that (1) while the step is corrected through the correction of the step of the output level due to the ghost, it is preferable to perform the ghost correction after the step caused by normal color mixture is corrected through color mixture correction since there is a possibility of increasing the step when color mixture correction is performed after such correction, (2) it is preferable to perform ghost step correction before noise correction because the ghost step is also reduced and the determination of the ghost becomes less accurate since a step is reduced even in the noise correction, or (3) it is preferable to perform the determination according to such correction timing.

Further, while the detection of the ghost is performed after the color mixture correction in the present embodiment as described above, the detection of the ghost in the image processing device, the imaging device, and the image processing method of the present invention is not limited to being performed after the color mixture correction and may be performed before the color mixture correction. This is because the color mixture correction and the ghost detection can be processed in parallel by performing the ghost detection based on data before the color mixture correction, and the processing time can be shortened.

As described above, in the imaging device 100 according to the present embodiment, an optical low-path filter (LPF) is not provided for the imaging element 202. Therefore, when the light and shade pattern of the high frequency is included in a subject, a light and shade pattern of a high frequency cut in an imaging device in which the optical low pass filter is provided is incident on the imaging surface of the imaging element. Accordingly, a determination regarding the light and shade pattern of the high frequency included in the subject and the output level difference between adjacent pixels due to the ghost light is important. However, by performing the detection and correction process described above, it is possible to determine whether the output level difference is due to the ghost light or due to the pattern included in the subject, and it is possible to prevent an output step from standing out when the output level difference is due to ghost light. This is particularly effective for improvement of image quality.

As described above, according to the imaging device, the image processing device, and the image processing method according to the present embodiment, it is possible to appropriately perform the detection and correction of the ghost, and to obtain an image having good quality.

<Second Embodiment>

Next, a second embodiment of the present invention will be described. Even in the second embodiment, an imaging device which is a lens-interchangeable camera (an imaging device) includes a camera body (image processing device), and an interchangeable lens (lens device) interchangeably mounted on the camera body, as in the first embodiment. The configuration of the imaging device, the camera body and the interchangeable lens according to the second embodiment are the same as the configurations of the imaging device 100, the camera body 200, and the interchangeable lens 300 according to the first embodiment (see FIGS. 1 to 3), but a color filter array of color filters CF provided in the imaging element in the second embodiment differs from that in the first embodiment. Further, in the imaging device according to the second embodiment, an optical low-path filter (LPF) is not provided in the imaging element, as in the first embodiment.

<Characteristics of Color Filter Array>

In the second embodiment, the color filter array of the imaging element has the following characteristics (1), (2), (3) and (4).

[Characteristic (1)]

Figure 22:
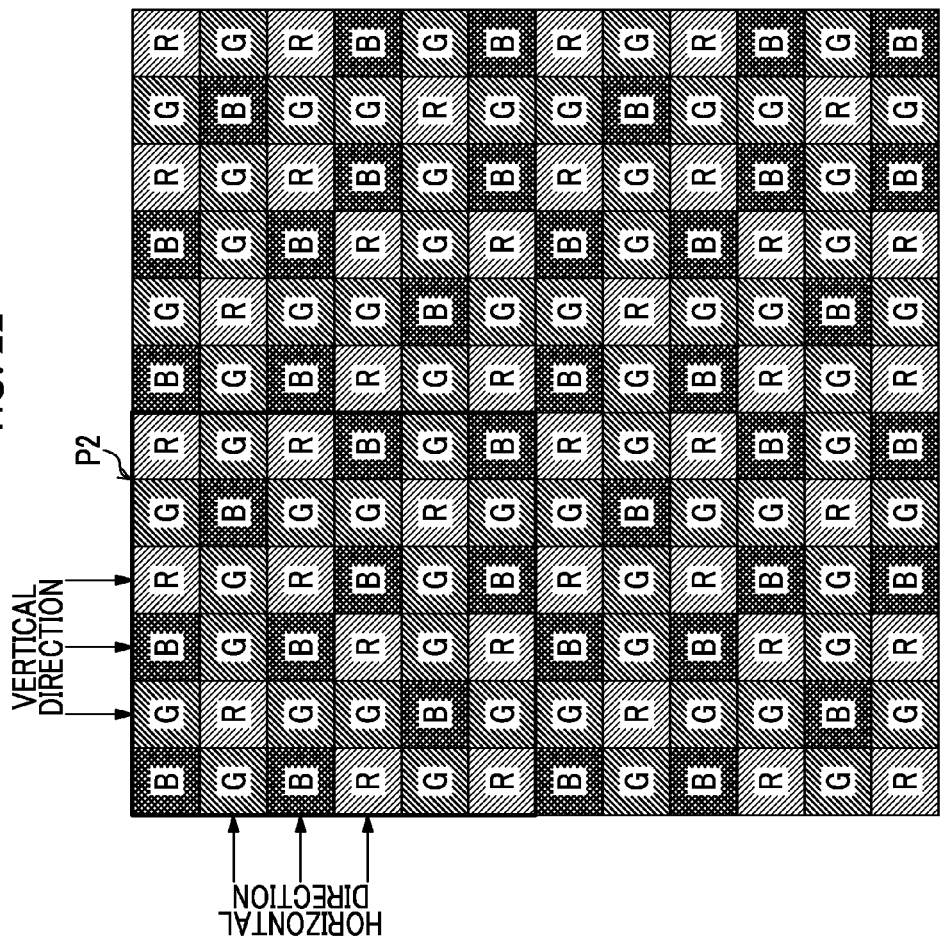
FIG. 22 is a diagram illustrating a single-plate type imaging element according to a second embodiment of the present invention.

A color filter array illustrated in FIG. 22 includes a basic array pattern P2 (a pattern indicated by a bold frame) including a square array pattern corresponding to 6×6 pixels, and this basic array pattern P2 is repeatedly arranged in the horizontal and vertical directions. That is, in this color filter array, filters (an R filter, a G filter, and a B filter) of respective colors of R, G and B are arranged with a predetermined period.

Since the R filter, the G filter, and the B filter are arranged with a predetermined period in this way, the process can be performed according to a repetitive pattern when the synchronization (interpolation) process of the R, G, and B signals read from the imaging element is performed.

Further, when a decimation process is performed in units of basic array patterns P2 to reduce an image, a color filter array of the reduced image after the decimation process may be the same as a color filter array before the decimation process, and a common processing circuit can be used.

[Characteristic (2)]

In the basic array pattern P2 constituting the color filter array illustrated in FIG. 22, one or more G filters corresponding to a color (color of G in this embodiment) contributing most to obtaining a luminance signal and one or more R and B filters corresponding to other colors (R and B in this embodiment) other than the color of G are arranged in each of the lines in the horizontal and vertical directions within the basic array pattern.

Since the respective R, G and B filters are arranged in each of the lines in the horizontal and vertical direction within the basic array pattern P, it is possible to suppress generation of color moire (false color). Accordingly, it is unnecessary to arrange an optical low pass filter for suppressing generation of the false color in the optical path from the incidence surface to the imaging surface of the optical system, or it is possible to apply an optical low pass filter in which a function of cutting a high frequency component for preventing generation of the false color is weak when the optical low pass filter is applied, thereby preventing degradation of resolution.

[Characteristic (3)]

The G filters corresponding to the luminance-based pixels are arranged so that a portion in which the two or more G filters are adjacent in each of horizontal, vertical, and diagonal directions (NE and NW) is included within the color filter array.

Figure 23:
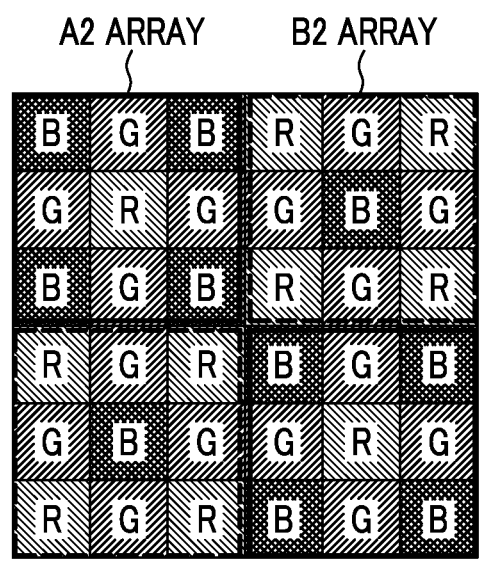
FIG. 23 is a diagram illustrating a basic array pattern included in a color filter array of the imaging element of the second embodiment.

FIG. 23 illustrates a state in which the basic array pattern P2 illustrated in FIG. 22 is divided in 4 into 3×3 pixels.

The basic array pattern P2 can be understood to be an array in which an A2 array of 3×3 pixels surrounded by a frame indicated by a solid line and a B2 array of 3×3 pixels surrounded by a frame indicated by a dashed line are alternately arranged in horizontal and vertical directions, as illustrated in FIG. 23.

In the A2 array, the R filter is arranged at the center, B filters are arranged at four corners, and G filters are arranged on the upward, downward, right and left side with the R filter at the center interposed therebetween. On the other hand, in the B2 array, the B filter is arranged at the center, R filters are arranged at four corners, and the G filters are arranged upward, downward, rightward, and leftward with the B filter at the center interposed therebetween. Between the A2 array and the B2 array, a positional relationship between the R filter and the B filter is reversed, but other arrangements are the same.

Figure 24A:
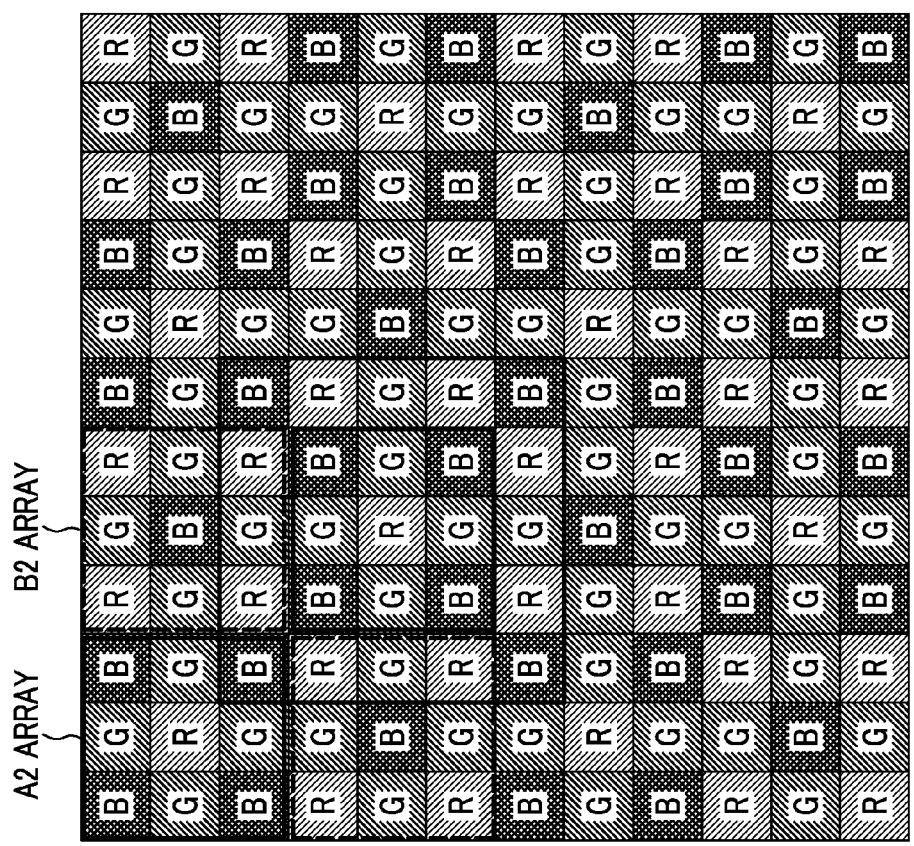
FIG. 24A is a diagram illustrating a color filter array obtained by dividing a basic array pattern of 6×6 pixels included in the color filter array of the imaging element of the first embodiment into an A2 array and a B2 array of 3×3 pixels and repeatedly arranging the arrays in horizontal and vertical directions.

The color filter array of the imaging element of the second embodiment can be understood as an array in which the A2 array and the B2 array described above are alternately arranged in horizontal and vertical directions, as illustrated in FIG. 24A.

Figure 24B:
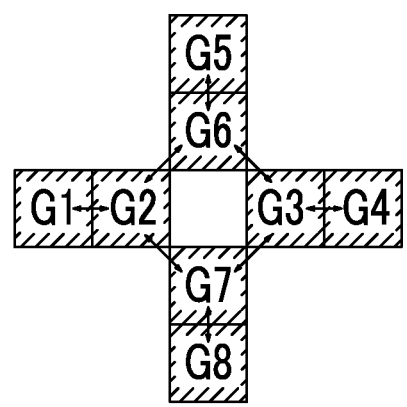
FIG. 24B is a diagram illustrating a characteristic arrangement of G pixels by the color filter array illustrated in FIG. 24A.

Further, since the G filter which is a luminance-based pixel is arranged upward, downward, rightward, and leftward with the filter at the center interposed therebetween in the 3×3 pixels in the A2 array or the B2 array, and the 3×3 pixels are alternately arranged in the horizontal and vertical directions, a portion in which two or more G filters are adjacent in each of the horizontal, vertical, and diagonal (NE and NW) directions is formed and arranged in a cross shape, as illustrated in FIG. 24B. Further, using such an array, the characteristics (1) and (3) described above are satisfied, and the characteristic (2) is satisfied for the G filter.

Then, in the mosaic image output from the imaging element of the first embodiment, a local area of 5×5 pixels (an area indicated by a bold frame) based on the A2 array is extracted as illustrated in FIG. 24A, eight G pixels within this local area are arranged in a cross form as illustrated in FIG. 24B. When the G pixels are G1, G2, G3, and G4 in order from the left to the right and are G5, G6, G7, and G8 in order from the top to the bottom, the pixels G1G2 and G2G3 are adjacent in a horizontal direction, the pixels G5G6 and G7G8 are adjacent in a vertical direction, the pixels G6G3 and G2G7 are adjacent in the upper left diagonal direction, and the pixels G6G2 and G3G7 are adjacent in an upper right diagonal direction.

Therefore, a direction in which change in luminance is smallest (a high-correlation direction) among the horizontal, vertical, and diagonal (NE and NW) directions can be determined at a minimum pixel interval by obtaining an absolute value of the difference between the pixel values of the adjacent pixels.

That is, a sum of absolute values of the differences in a horizontal direction is |G1−G2|+|G3−G4|, a sum of absolute values of the differences in a horizontal direction is |G5−G6|+|G7−G8|, a sum of absolute values of the differences in an upper right diagonal direction is |G6−G2|+|G3−G7|, and a sum of absolute values of the differences in an upper left diagonal direction is |G6−G3|+|G2−G7|.

It can be determined that there is correlation in a direction in which a minimum absolute value of the difference among the four correlation absolute values is taken (correlation direction). Further, the determined correlation direction can be used when a synchronization (interpolation) process is performed.

Further, while the direction in which change in luminance is smallest (high-correlation direction) may be determined based on the value of the difference between the pixel values of the adjacent G pixels in the present embodiment, the present invention is not limited thereto and the direction in which the change in luminance is smallest may be determined based on a ratio of the pixel values of the adjacent G pixels. When the change in luminance is determined based on the ratio of the pixel values of the adjacent G pixels, a direction in which the ratio becomes about 1 is the direction in which the change in luminance is small.

<Interpolation Method Using Correlation Direction>

Next, an interpolation method using the correlation direction determined as described above will be described.

When it is determined that the correlation direction is in a vertical direction as illustrated in FIG. 25 and pixel values of other colors in pixel positions of the respective 3×3 pixels (A2 array) inside a bold frame illustrated in FIG. 25 are obtained through interpolation, the pixel value of the same color pixel adjacent in the correlation direction is used.

When the pixel value of G is interpolated, the pixel value of G23 is used for pixel values G22' and G24' of G in pixel positions of B22 and B24, and a pixel value of G43 is used for pixel values G42' and G44' of G in pixel positions of B42 and B44. On the other hand, the average value of pixel values of G32 and G34 is used for a pixel value G33' of G in a pixel position of R33.

When pixel values of R and B are interpolated, a pixel value of R21 is used for a pixel value R22' of R in a pixel position of B22, an average value of the pixel values of R21 and R25 and average values of the pixel values of B22 and B24 are used for pixel values R23' and B23' of R and B in the pixel position of G23, respectively, and pixel values of R21 and R25 are used for pixel values R22' and R24' of R in pixel positions of B22 and B24.

Pixel values of R33 and B30 are used for pixel values R32' and B32' of R and B in a pixel position of G32, an average value of pixel values of R30 and R36 is used for a pixel value B33' of B in a pixel position of R33, and pixel values of B33 and B36 are used for pixel values R34' and B34' of R and B in a pixel position of G34, respectively.

A pixel value of R41 is used for a pixel value R42' of R in a pixel position of B42, an average value of pixel values of R41 and R45 and an average value of the pixel values of B42 and B44 are used for pixel values R43' and B43' of R and B in a G43 pixel position, respectively, and a pixel value of R45 is used for a pixel value R44' of R in a pixel position of B44.

In the case of the B2 array, interpolation of the pixel values of RGB is performed by replacing R and B to perform the same process.

The pixel values of RGB are interpolated by repeating the above process for every 3×3 pixels.

On the other hand, when it is determined that there is a correlation direction in the upper left diagonal direction, as illustrated in FIG. 26, and pixel values of other colors in the pixel positions of the respective 3×3 pixels (A2 array) of a bold frame illustrated in FIG. 26 are obtained through interpolation, the interpolation is performed using pixel values if a pixel of color to be interpolated is present in the vicinity of the correlation direction, and is performed using a relationship of the difference between or the ratio of the interpolated pixel values of RGB of the pixels present in the vicinity (a color difference or a color ratio) if a pixel of color to be interpolated is not present in the vicinity of the correlation direction.

First, interpolation is performed from a pixel for which a pixel of a color to be interpolated in the interpolation direction is present. In FIG. 26, a pixel value of R23 is used for a pixel value R22' of R in a pixel position of B22, a pixel value of R21 is used for a pixel value R32' of R in a pixel position of G32, and an average value of the pixel values of G31 and G53 is used for a pixel value G42' of G in a pixel position of B42. Then, pixel values of the pixels of the colors to be interpolated that are present in the correlation direction are similarly used for R23', B33', R43', G24', R34', and R44'.

Next, a method of processing interpolation of a pixel for which the pixel of the color to be interpolated in the correlation direction is not present will be described.

When a pixel value G22' of G in a pixel position of B22 of FIG. 26 is obtained through interpolation, the interpolation is performed using a color difference between a pixel value B13' interpolated with G13 and a pixel value B31' interpolated with G31. Specifically, the value is calculated through calculation of an expression below.

$$G22'=B22+(G13+G31)/2-(B13'+B31')/2 \quad \text{[Expression 3]}$$

Similarly, a method of interpolating the pixel value B32' of B in the pixel position of G32 and the pixel value R42' of R in the pixel position of B42 is as in the following expression.

$$B32'=G32+B31'-G31$$

$$R42'=B42+R33-B33'$$  [Expression 4]

The same process is performed for the interpolation of B32', G33', B43', R24', B34', and G44'.

This process is repeated for every 3×3 pixels to interpolate the pixel values of R, G, and B.

Further, even when the correlation direction is determined to be the horizontal direction based on the symmetry of the color filters of R, G, and B in the A2 array and the B2 array or when the correlation direction is determined to be the upper right direction, the pixel values of RGB can be obtained through interpolation, as in the case in which the correlation direction is determined to be the vertical direction or when the correlation direction is determined to be the upper left direction as described above.

Further, while the interpolation is performed using the color difference in Expressions 3 and 4 above, the interpolation may be performed using the color ratio.

[Characteristic (4)]

The basic array pattern P2 constituting the color filter array illustrated in FIG. 22 is point-symmetric to a center of the basic array pattern P2.

The A2 array and the B2 array within the basic array pattern are point-symmetric to the R filter and the G filter at the centers, respectively, and up, down, right and left are symmetric (line-symmetric), as illustrated in FIG. 23.

Through such symmetry, it is possible to reduce or simplify the circuit scale of the processing circuit in a subsequent stage.

[Characteristic (5)]

In the basic array pattern of the color filter array illustrated in FIG. 22, the pixel numbers of R, G, and R pixels corresponding to the R, G, and B filters in the basic array pattern are 10, 16, and 10, respectively. In other words, a ratio of the number of RGB pixels is 5:8:5, and a percentage of the number of G pixels contributing most to obtaining a luminance signal is higher than those of the numbers of the R pixels and the B pixels of other colors.

As described above, since the ratio of the number of G pixels and the numbers of R and B pixels is different, and particularly, the percentage of the number of G pixels contributing most to obtaining a luminance signal is greater than the percentage of the numbers of R and B pixels, it is possible to suppress aliasing in the synchronization process and to perform high frequency reproduction well.

Further, while there are a plurality of basic array patterns capable of constituting the color filter array illustrated in FIG. 22 by repeatedly arranging the basic array pattern in the horizontal and vertical directions, the basic array pattern P2 in which the basic array pattern is point-symmetric is referred to as a basic array pattern, for convenience, in the second embodiment.

Since the imaging device according to the second embodiment uses the imaging element on which the color filters in the color filter array as in FIG. 22 are mounted, it is possible to reduce generation of color moire (false color) even when a the high frequency pattern is contained in a subject without an optical low pass filter (LPF).

Further, a form in which the function of the low-path filter is reduced or a form in which the function is suppressed, not a form in which such an optical low pass filter is not provided, may be adopted.

<Ghost Detection and Correction Process>

With the configuration described above, in the second embodiment, it is determined whether the output level difference between the same color pixels that are adjacent is caused by the light and shade pattern of the subject or the ghost light using the threshold, as in the first embodiment. Specifically, the state of the ghost generation and the setting of the threshold are as in FIGS. 9 to 17 and the corresponding description described above, the ghost detection and correction process is as in FIGS. 18 and 19 and the corresponding description described above, and a timing of the ghost detection and correction process is as in FIG. 21 and the corresponding description described above.

Further, for a configuration that may be selectively adopted in the first embodiment (for example, whether the determination of the ghost generation is performed on the G pixel and the correction is uniformly performed on the G pixel, including the B and R pixels, based on a result of the determination or the determination and the correction are individually performed on the respective color pixels of RGB), any aspect may be adopted in the second aspect, as well.

As described above, in the imaging device according to the second embodiment, the optical low-path filter (LPF) is not provided in the imaging element, as in the first embodiment. Therefore, when the light and shade pattern of the high frequency is included in the subject, the light and shade pattern of a high frequency cut in an imaging device in which an optical low pass filter is provided is incident on the imaging surface of the imaging element. Accordingly, the determination of the light and shade pattern of the high frequency included in the subject and the output level difference between adjacent pixels due to the ghost light becomes important. However, by performing the detection and correction process described above, it is possible to determine whether the output level difference is due to the ghost light or the pattern included in the subject, and to prevent the output step from standing out when the output level difference is due to the ghost light. This is particularly effective for improvement of image quality.

As described above, according to the imaging device, the image processing device, and the image processing method according to the second embodiment, it is possible to appropriately perform the detection and correction of the ghost and to obtain an image having good quality, as in the first embodiment.

While the present invention has been described using the respective embodiments, embodiments of the present invention are not limited to the above embodiments and various modifications can be made without departing from the spirit of the present invention.

What is claimed is:

1. An imaging device, comprising:
   a photography optical system;
   a single plate-type imaging element in which a plurality of pixels including two-dimensionally arranged photoelectric conversion elements and having a different underlayer layout are repeatedly arranged in a predetermined pattern, and color filters in a predetermined color filter array are arranged on the plurality of pixels;
   a determination unit configured to determine that a ghost is generated when an output level of one of the plurality of pixels and an output level of the same color pixel in the vicinity of the one pixel, which is the other pixel having a different underlayer layout from the one pixel, are different within a range in which the output levels do not exceed a previously set threshold, which is based on characteristics or a usage situation of the photography optical system, and when the difference between the output level of the one pixel and the output level of the other pixel is repeatedly generated according to a repetition period of the underlayer layout; and a correction unit configured to perform correction to reduce a difference between the output level of the one pixel and the output level of the same color pixel in the vicinity when the determination unit determines that the ghost is generated, wherein the determination unit performs a determination as to whether a ghost is generated with respect to a pixel corresponding to one of the filter colors of the color filters, and when the determination unit determines that the ghost is generated with respect to the one color, the correction unit performs the correction on pixels corresponding to all filter colors of the color filters including the one color.

2. The imaging device according to claim 1,
wherein the imaging element has a different underlayer layout between adjacent lines in the two-dimensional array, and the determination unit determines that the ghost is generated when the output levels of the same color pixels present on the adjacent lines are different within a range in which the output levels do not exceed the threshold.

3. The imaging device according to claim 1,
wherein the determination unit performs the determination on the pixels corresponding to all filter colors of the color filters, and
the correction unit performs the correction on pixels corresponding to a color in which the ghost is determined to be generated.

4. The imaging device according to claim 1,
wherein the threshold used by the determination unit is set according to a pixel position of a captured image.

5. The imaging device according to claim 1,
wherein the determination unit performs the determination based on a threshold set according to each component of the imaging element.

6. The imaging device according to claim 1,
wherein an imaging surface of the imaging element is divided into a plurality of areas, and
the determination unit performs the determination based on an integration value of output levels of the same color pixels within at least one of the plurality of areas.

7. The imaging device according to claim 1,
wherein the correction unit reduces the generated output level difference by decreasing a higher output level to lower output level among an output level of the one pixel and an output level of the other pixel.

8. The imaging device according to claim 1,
wherein the determination unit and the correction unit perform the determination and correction after scratch correction and color mixture correction of a signal output from the imaging element is performed and before noise removal correction of the signal is performed.

9. The imaging device according to claim 1,
wherein a function of an optical low pass filter is not mounted on the photography optical system.

10. The imaging device according to claim 1,
wherein the color filter array includes a predetermined basic array pattern in which first filters corresponding to a first color contributing most to obtaining a luminance signal and second filters corresponding to two or more second colors other than the first color are arranged, the basic array pattern being repeatedly arranged in horizontal and vertical directions, and at least one filter with the same color among the first filter and the second filter is continuously arranged over two or more pixels in the horizontal and vertical directions in the basic array pattern.

11. The imaging device according to claim 10,
wherein one or more first filters and one or more second filters are arranged within each of the lines in the horizontal and vertical directions of the color filter array within the basic array pattern, and
the first filters are arranged so that a portion in which two or more of the first filters are adjacent in each of the horizontal, vertical, upper right diagonal and upper left diagonal directions is included within the basic array pattern.

12. The imaging device according to claim 10,
wherein in the color filter array, two or more first filters are continuously arranged in the vertical and horizontal directions with any one color filter of the second filters interposed between the first filters.

13. The imaging device according to claim 10,
wherein in the color filter array, the first filters are arranged upward, downward, rightward, and leftward in a 3×3 pixel group with a filter at the center interposed between the first filters, and the 3×3 pixel group is repeatedly arranged in the horizontal and vertical directions.

14. The imaging device according to claim 10,
wherein the first color is green (G), and the second colors are red (R) and blue (B),
the color filters include an R filter, a G filter and a B filter corresponding to the red (R), the green (G), and the blue (B), and
the color filter array includes a first array corresponding to 3×3 pixels, in which an R filter is arranged at a center, a B filter is arranged at four corners, and a G filter is arranged upward, downward, rightward and leftward with the R filter at the center interposed between the G filters, and a second array corresponding to 3×3 pixels, in which a B filter is arranged at the center, an R filter is arranged at four corners, and a G filter is arranged upward, downward, rightward and leftward with the B filter at the center interposed between the G filters, the first array and the second array being alternately arranged in the horizontal and vertical directions.

15. The imaging device according to claim 1,
wherein the color filter array includes a predetermined basic array pattern in which a first filter corresponding to a first color contributing most to obtaining a luminance signal among colors of the filters of the color filters, and second filters corresponding to two or more second colors other than the first color are arranged, the basic array pattern being repeatedly arranged in the horizontal and vertical directions, and
one or more first filters are arranged in each of the lines in the horizontal, vertical, upper right diagonal, and upper left diagonal directions of the color filter array, and one or more second filters are arranged in each of the lines in the horizontal and vertical directions of the color filter array within the basic array pattern.

16. The imaging device according to claim 15,
wherein the color filter array includes a portion in which two or more first filters are continuous in each of the lines in the vertical, horizontal, upper right diagonal, and upper left diagonal directions.

17. The imaging device according to claim 15,
wherein the color filter array includes a square array corresponding to 2×2 pixels including the first filters.

18. The imaging device according to claim 15,
wherein in the color filter array, the first filter is arranged at a center and four corners in a 3×3 pixel group, and the 3×3 pixel group is repeatedly arranged in the horizontal and vertical directions.

19. The imaging device according to claim 15,
wherein the first color is green (G), and the second colors are red (R) and blue (B),
the predetermined basic array pattern is a square array pattern corresponding to 6×6 pixels, and
the color filter array includes a first array corresponding to 3×3 pixels, in which the G filter is arranged at the center and four corners, the B filter is arranged up and down with the G filter at the center interposed between the B filters, and the R filter is arranged right and left with the G filter at the center interposed between the R filters, and a second array corresponding to 3×3 pixels, in which the G filter is arranged at the center and four corners, the R filter is arranged up and down with the G filter at the center interposed between the R filters, and the B filter is arranged right and left with the G filter at the center interposed between the B filters, the first array and the second array being alternately arranged in the horizontal and vertical directions.

20. An image processing device, comprising:
a single plate-type imaging element in which a plurality of pixels including two-dimensionally arranged photoelectric conversion elements and having a different underlayer layout are repeatedly arranged in a predetermined pattern, and color filters in a predetermined color filter array are arranged on the plurality of pixels;
a determination unit configured to determine that a ghost is generated when an output level of one of the plurality of pixels and an output level of the same color pixel in the vicinity of the one pixel, which is the other pixel having a different underlayer layout from the one pixel, are different within a range in which the output levels do not exceed a previously set threshold, and when the difference between the output level of the one pixel and the output level of the other pixel is repeatedly generated according to a repetition period of the underlayer layout,
a correction unit configured to perform correction to reduce a difference between the output level of the one pixel and the output level of the same color pixel in the vicinity when the determination unit determines that the ghost is generated,
a lens device interchangeably mounted on the image processing device;
storage unit configured to store lens information of the lens device and the threshold in association with each other; and
lens information acquisition unit configured to acquire lens information of a lens mounted on the image processing device,
wherein the determination unit acquires the threshold corresponding to the acquired lens information by referring to the storage unit, and performs the determination based on the acquired threshold.

21. The imaging device according to claim 20,
wherein the lens information includes at least one of an aperture value, a zoom position, and a focus position of the mounted lens.

22. The imaging device according to claim 20,
wherein a function of an optical low pass filter is not mounted.

23. An image processing method in an imaging device including a photography optical system, and a single plate-type imaging element in which a plurality of pixels including two-dimensionally arranged photoelectric conversion elements and having a different underlayer layout are repeatedly arranged in a predetermined pattern, and color filters in a predetermined color filter array are arranged on the plurality of pixels, the method comprising:
a determination step of determining that a ghost is generated when an output level of one of the plurality of pixels and an output level of the same color pixel in the vicinity of the one pixel, which is the other pixel having a different underlayer layout from the one pixel, are different within a range in which the output levels do not exceed a previously set threshold, which is based on characteristics or a usage situation of the photography optical system, and when the difference between the output level of the one pixel and the output level of the other pixel is repeatedly generated according to a repetition period of the underlayer layout; and
a correction step of performing correction to reduce a difference between the output level of the one pixel and the output level of the same color pixel in the vicinity when it is determined in the determination step that the ghost is generated,
wherein the determination step performs a determination as to whether a ghost is generated with respect to a pixel corresponding to one of the filter colors of the color filters, and
when the determination step determines that the ghost is generated with respect to the one color, the correction unit performs the correction on pixels corresponding to all filter colors of the color filters including the one color.

24. An image processing method in an image processing device including a single plate-type imaging element in which a plurality of pixels including two-dimensionally arranged photoelectric conversion elements and having a different underlayer layout are repeatedly arranged in a predetermined pattern, color filters in a predetermined color filter array are arranged on the plurality of pixels, a lens device interchangeably mounted on the image processing device, and storage unit configured to store lens information of the lens device and a threshold in association with each other, the method comprising:
a determination step of determining that a ghost is generated when an output level of one of the plurality of pixels and an output level of the same color pixel in the vicinity of the one pixel, which is the other pixel having a different underlayer layout from the one pixel, are different within a range in which the output levels do not exceed the previously set threshold, and when the difference between the output level of the one pixel and the output level of the other pixel is repeatedly generated according to a repetition period of the underlayer layout; and
a correction step of performing correction to reduce a difference between the output level of the one pixel and the output level of the same color pixel in the vicinity when it is determined in the determination step that the ghost is generated,
lens information acquisition step of acquiring lens information of a lens mounted on the image processing device,
wherein the determination step acquires the threshold corresponding to the acquired lens information by referring to the storage unit, and performs the determination based on the acquired threshold.

25. An imaging device, comprising:

a photography optical system;

a single plate-type imaging element in which a plurality of pixels including two-dimensionally arranged photoelectric conversion elements and having a different underlayer layout are repeatedly arranged in a predetermined pattern, and color filters in a predetermined color filter array are arranged on the plurality of pixels;

a determination unit configured to determine that a ghost is generated when an output level of one of the plurality of pixels and an output level of the same color pixel in the vicinity of the one pixel, which is the other pixel having a different underlayer layout from the one pixel, are different within a range in which the output levels do not exceed a previously set threshold, and when the difference between the output level of the one pixel and the output level of the other pixel is repeatedly generated according to a repetition period of the underlayer layout; and a correction unit configured to perform correction to reduce a difference between the output level of the one pixel and the output level of the same color pixel in the vicinity when the determination unit determines that the ghost is generated, wherein a function of an optical low pass filter is not mounted on the photography optical system.

26. An image processing device, comprising:

a single plate-type imaging element in which a plurality of pixels including two-dimensionally arranged photoelectric conversion elements and having a different underlayer layout are repeatedly arranged in a predetermined pattern, and color filters in a predetermined color filter array are arranged on the plurality of pixels;

a determination unit configured to determine that a ghost is generated when an output level of one of the plurality of pixels and an output level of the same color pixel in the vicinity of the one pixel, which is the other pixel having a different underlayer layout from the one pixel, are different within a range in which the output levels do not exceed a previously set threshold, and when the difference between the output level of the one pixel and the output level of the other pixel is repeatedly generated according to a repetition period of the underlayer layout; and a correction unit configured to perform correction to reduce a difference between the output level of the one pixel and the output level of the same color pixel in the vicinity when the determination unit determines that the ghost is generated, wherein a function of an optical low pass filter is not mounted.

* * * * *